United States Patent
Keller et al.

(10) Patent No.: US 10,684,690 B2
(45) Date of Patent: Jun. 16, 2020

(54) METHODS, DEVICES, AND SYSTEMS FOR CREATING LOCALIZED HAPTIC STIMULATIONS ON A USER

(71) Applicants: FACEBOOK TECHNOLOGIES, LLC, Menlo Park, CA (US); The Regents of the University of California, Oakland, CA (US)

(72) Inventors: Sean Jason Keller, Bellevue, WA (US); Tristan Thomas Trutna, Seattle, WA (US); Hrvoje Benko, Seattle, WA (US); Raymond King, Woodinville, WA (US); Andrew Arthur Stanley, Seattle, WA (US); Massimiliano Di Luca, Redmond, WA (US); Yon Visell, Santa Barbara, CA (US); Yitian Shao, Goleta, CA (US); Bharat Dandu, Goleta, CA (US)

(73) Assignees: Facebook Technologies, LLC, Menlo Park, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 16/241,900

(22) Filed: Jan. 7, 2019

(65) Prior Publication Data
US 2019/0212824 A1 Jul. 11, 2019

Related U.S. Application Data

(60) Provisional application No. 62/636,699, filed on Feb. 28, 2018, provisional application No. 62/647,559, (Continued)

(51) Int. Cl.
*G06F 3/01* (2006.01)
*G06T 19/00* (2011.01)
(Continued)

(52) U.S. Cl.
CPC .............. *G06F 3/016* (2013.01); *G06F 1/163* (2013.01); *G06F 3/011* (2013.01); *G06F 3/014* (2013.01);
(Continued)

(58) Field of Classification Search
CPC .......... G06F 3/016; G06F 3/014; G06F 3/011; G06F 1/163; G06F 3/017; G06F 3/015;
(Continued)

(56) References Cited

U.S. PATENT DOCUMENTS

| | | |
|---|---|---|
| 9,797,691 B1 | 10/2017 | Hunn et al. |
| 2008/0009764 A1* | 1/2008 | Davies ................ A61B 5/0536 600/547 |

(Continued)

FOREIGN PATENT DOCUMENTS

| | | |
|---|---|---|
| WO | WO2015-102464 A1 | 7/2015 |
| WO | WO2015-127116 A1 | 8/2015 |
| WO | WO2015-199898 A1 | 12/2015 |

OTHER PUBLICATIONS

Da-Chen Pang et al., A Transparent Capacitive Micromachined Ultrasonic Transducer (CMUT) Array for Finger Hover-Sensing Dial Pads, 2017 19th International Conference on Solid-State Sensors, Actuators and Microsystems (Transducers), Kaohsiung, Taiwan: IEEE, Jun. 18-22, 2017, pp. 2171-2174, 4pgs.

(Continued)

*Primary Examiner* — Ryan Barrett
*Assistant Examiner* — Parmanand D Patel
(74) *Attorney, Agent, or Firm* — Morgan, Lewis & Bockius LLP

(57) ABSTRACT

A method of creating localized haptic stimulations on a user includes a wearable device including a plurality of transducers that can each generate one or more waves that propagate away from the wearable device through a (Continued)

medium. The method includes activating two or more transducers of the plurality of transducers, selecting values for characteristics of waves to be generated by the two or more transducers based at least in part on a known impedance of the medium. The method further includes generating, by the two or more transducers, waves that constructively interfere at a target location to create a haptic stimulation on a user of the wearable device, the waves having the selected values.

19 Claims, 15 Drawing Sheets

Related U.S. Application Data filed on Mar. 23, 2018, provisional application No. 62/647,560, filed on Mar. 23, 2018, provisional application No. 62/614,790, filed on Jan. 8, 2018.

(51) Int. Cl.
    *G06K 19/077*     (2006.01)
    *G06F 1/16*     (2006.01)

(52) U.S. Cl.
    CPC ............. *G06F 3/015* (2013.01); *G06F 3/017* (2013.01); *G06K 19/07762* (2013.01); *G06T 19/006* (2013.01)

(58) Field of Classification Search
    CPC ....... G06F 3/012; G06F 3/013; G06T 19/006; G06K 19/07762
    See application file for complete search history.

(56) References Cited

U.S. PATENT DOCUMENTS

| | | |
|---|---|---|
| 2014/0125571 A1 | 5/2014 | Um et al. |
| 2015/0317885 A1* | 11/2015 | Ramstein ................. G08B 6/00 340/407.1 |
| 2016/0019762 A1 | 1/2016 | Levesque et al. |
| 2016/0100034 A1 | 4/2016 | Miller |
| 2016/0357261 A1 | 12/2016 | Bristol et al. |
| 2017/0097753 A1 | 4/2017 | Bailey et al. |
| 2017/0102771 A1* | 4/2017 | Lei ........................ G06F 3/0436 |
| 2017/0115733 A1 | 4/2017 | Du |
| 2017/0123487 A1* | 5/2017 | Hazra .................... G06F 3/015 |
| 2017/0220005 A1 | 8/2017 | Han et al. |

OTHER PUBLICATIONS

FaceBook Technologies, LLC, International Search Report and Written Opinion, PCT/US2019/012697, dated Apr. 29, 2019, 10 pgs.
FaceBook Technologies, LLC, International Search Report and Written Opinion, PCT/US2019/012702, dated Apr. 29, 2019, 11 pgs.
FaceBook Technologies, LLC, International Search Report and Written Opinion, PCT/US2019/012718, dated May 3, 2019, 10 pgs.
FaceBook Technologies, LLC, International Search Report and Written Opinion, PCT/US2019/012721, dated Apr. 29, 2019, 10 pgs.
Keller, Office Action, U.S. Appl. No. 16/241,871, dated Oct. 30, 2019, 14 pgs.
Zhang, "SkinTrack: Using the Body as an Electrical Waveguide for Continuous Finger Tracking on the Skin," © 2016 ACM, ISBN978-1-4503-3362-7/16/05, 13 pgs.

\* cited by examiner

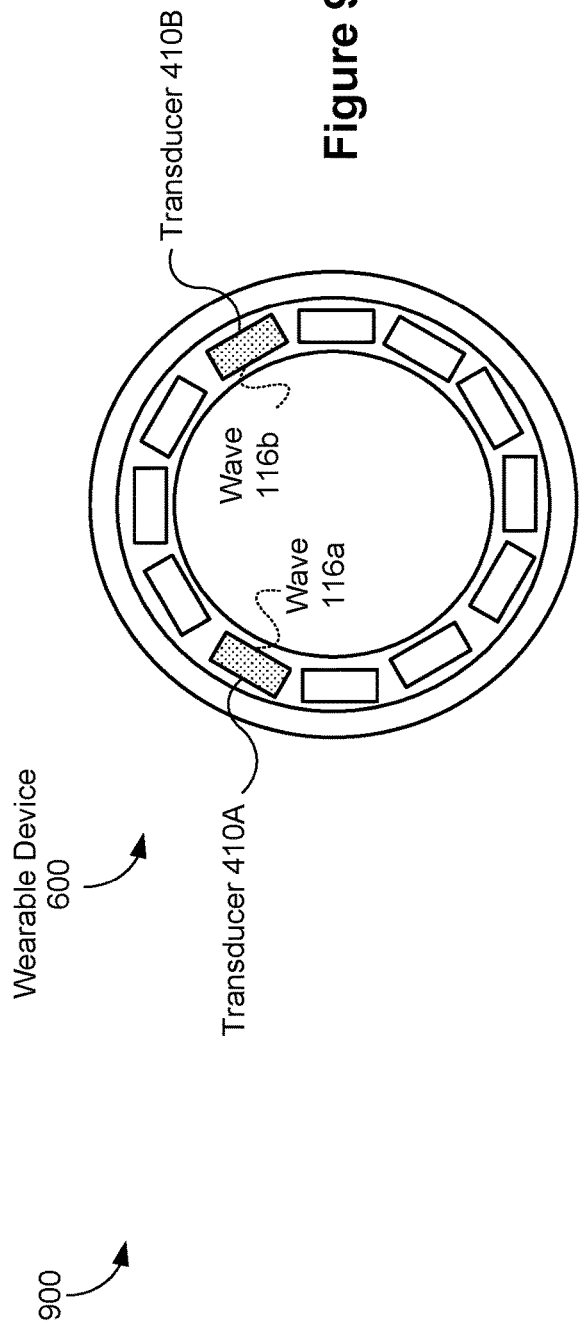
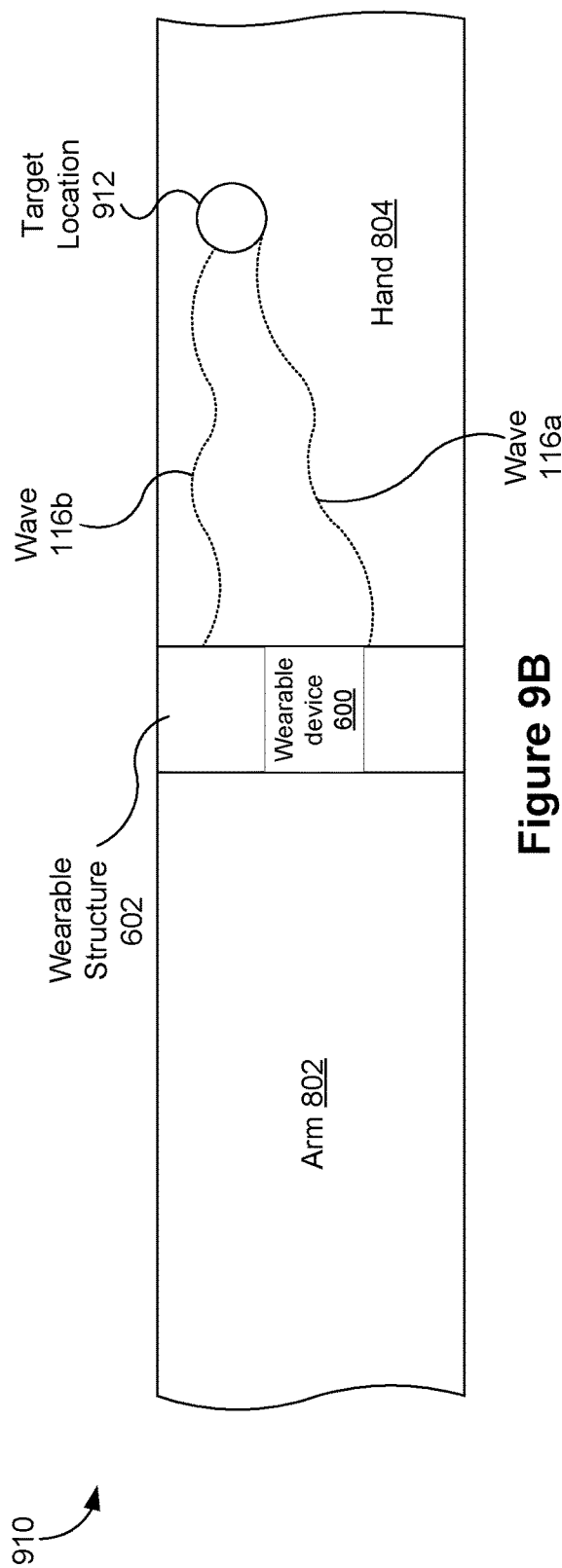

METHODS, DEVICES, AND SYSTEMS FOR CREATING LOCALIZED HAPTIC STIMULATIONS ON A USER

RELATED APPLICATIONS

This application claims priority to U.S. Provisional Application No. 62/636,699, filed Feb. 28, 2018, entitled "Methods, Devices, and Systems for Creating Haptic Stimulations and Tracking Motion of a User;" U.S. Provisional Application No. 62/647,559, filed Mar. 23, 2018, entitled "Methods, Devices, and Systems for Determining Contact On a User of a Virtual Reality and/or Augmented Reality Device;" U.S. Provisional Application No. 62/647,560, filed Mar. 23, 2018, entitled "Methods, Devices, and Systems for Projecting an Image Onto a User and Detecting Touch Gestures;" and U.S. Provisional Application No. 62/614,790, filed Jan. 8, 2018, entitled "Methods, Devices, and Systems for Creating Localized Haptic Sensations on a User," each of which is incorporated by reference herein in its entirety.

This application is related to U.S. Utility patent application Ser. No. 16/241,890 entitled "Methods, Devices, and Systems for Determining Contact On a User of a Virtual Reality and/or Augmented Reality Device," filed Jan. 7, 2019, U.S. Utility patent application Ser. No. 16/241,893 entitled "Methods, Devices, and Systems for Displaying a User Interface on a User and Detecting Touch Gestures," filed Jan. 7, 2019, and U.S. Utility patent application Ser. No. 16/241,871 entitled "Methods, Devices, and Systems for Creating Haptic Stimulations and Tracking Motion of a User," filed Jan. 7, 2019, each of which is incorporated by reference herein in its entirety.

TECHNICAL FIELD

This relates generally to haptic stimulation, including but not limited to creating localized haptic stimulations on and providing haptic stimulation to a user of a virtual reality and/or augmented reality device.

BACKGROUND

Haptic or kinesthetic communication recreates the sense of touch by applying forces, vibrations, and/or motions to a user. Mechanically stimulating the skin may elicit long range responses, including waves that travel throughout a limb. The skin's/flesh's viscoelasticity yields frequency-dependent attenuation and dispersion. Such stimulation of the skin/flesh elicits traveling waves that can reach far distances, affecting tactile localization and perception. However, creating a stimulation of sufficient magnitude presents a challenge.

SUMMARY

Accordingly, there is a need for methods, devices, and systems for creating localized stimulations having sufficient magnitudes. One solution is to generate multiple waves (e.g., ultrasonic waves) that constructively interfere at a target location. The constructive interference of the waves causes a haptic stimulation felt by a user. Additionally, time reversed focusing methods can be used for synthesis of waves for simulated contact at target locations on the user's body.

In some embodiments, the solution explained above can be implemented on a wearable device that includes a plurality of transducers (e.g., actuators). The wearable device in some instances is worn on the user's wrist (or various other body parts) and is used to stimulate areas of the body outside of the wearable device's immediate area of contact. Moreover, the wearable device can be in communication with a host system (e.g., a virtual reality device and/or an augmented reality device, among others), and the wearable device can stimulate the body based on instructions from the host system. As an example, the host system may display media content (e.g., video data) or provide concomitant audio signals to a user (e.g., the host system may instruct a head-mounted display to display the video data), and the host system may also instruct the wearable device to create localized haptic stimulations that correspond to the images displayed to the user. The media content or the concomitant audio signals displayed by the host system could be used to modify the perceptual or cognitive interpretation of the stimulation (i.e. by displacing the perceived location of the stimulation towards a seen contact with an object, or by modifying the perceived pattern of vibration to be closer to the produced sound).

The devices, systems, and methods describes herein provide benefits including but not limited to: (i) stimulating areas of the body outside of the wearable device's immediate area of contact, (ii) creating haptic stimulations of varying magnitudes depending on visual data or other data gathered by sensors (e.g., sensors on the wearable device), (iii) the wearable device does not encumber free motion of a user's hand and/or wrist (or other body parts), and (iv) multiple wearable devices can be used simultaneously.

(A1) In accordance with some embodiments, a method is performed at a wearable device that includes a plurality of transducers (or a single transducer), where each transducer generates one or more waves (also referred to herein as "signals") that propagate away from the wearable device through a medium (e.g., through a sublayer of the user's skin, the user's flesh, the user's bone, etc.). The method includes activating two or more transducers of the plurality of transducers. The method further includes selecting values for characteristics of waves to be generated by the two or more transducers based (or the single transducer), at least in part, on a known impedance of the medium. The method further includes generating, by the two or more transducers, waves that constructively interfere at a target location to create a haptic stimulation on a user of the wearable device, the waves having the selected values. In some embodiments, the waves are mechanical waves (e.g., soundwaves, ultrasonic waves, etc.). In some embodiments, the wearable device is attached to an appendage (e.g., wrist, forearm, bicep, thigh, ankle, chest, etc.) of the user. In some embodiments, the target location is on the appendage. For example, the wearable device can be attached to a wrist of the user with the target location being on the user's hand attached to the wrist. In some embodiments, the target location is on a finger, forearm, ankle, calf, bicep, ribs, etc. of the user.

(A2) In some embodiments of the method of A1, generating the waves by the two or more transducers includes transmitting the waves into a wrist of the user in a first direction and the waves propagate through the user's body away from the wrist in a second direction and constructively interfere at the target location. In some embodiments, the first direction is substantially perpendicular to the second direction.

(A3) In some embodiments of the method of any of A1-A2, activating the two or more transducers includes: (i) activating a first transducer of the two or more transducers at a first time, and (ii) activating a second transducer of the two or more transducers at a second time after the first time.

(A4) In some embodiments of the method of any of A1-A2, activating the two or more transducers includes activating the two or more transducers simultaneously.

(A5) In some embodiments of the method of any of A1-A4, further including receiving an instruction from a host in communication with the wearable device. Activating the two or more transducers is performed in response to receiving the instruction from the host.

(A6) In some embodiments of the method of A5, the instruction received from the host identifies the target location.

(A7) In some embodiments of the method of any of A5-A6, the wearable device further includes a communication radio in wireless communication with the host, and the communication radio receives the instruction from the host.

(A8) In some embodiments of the method of any of A1-A7, the wearable device further includes a controller in communication with the plurality of transducers, and the controller performs the activating and the selecting.

(A9) In some embodiments of the method of any of A1-A8, further including, at a second wearable device comprising a second plurality of transducers that can each generate one or more waves that propagate away from the second wearable device through the medium: (i) activating two or more transducers of the second plurality of transducers, (ii) selecting second values for characteristics of waves generated by the two or more transducers of the second plurality of transducers based, at least in part, on the known impedance of the medium, and (iii) generating, by the two or more transducers of the second plurality of transducers, waves that constructively interfere at a different target location to create a second haptic stimulation on the user, the waves having the second selected values.

(A10) In some embodiments of the method of A9, (i) the medium associated with the first wearable device is a first medium, and (ii) the medium associated with the second wearable device is a second medium having a different known impedance from the known impedance of the first medium.

(A11) In some embodiments of the method of A10, the second selected values differ from the first selected values based on impedance differences between the first and second media.

(A12) In some embodiments of the method of any of A1-A11, the target location is separated from the wearable device by a distance (e.g., a non-zero distance).

(A13) In some embodiments of the method of any of A1-A12, the wearable device further comprises a band to be secured around a wrist of the user, and each of the plurality of transducers is coupled to the band.

(A14) In some embodiments of the method of A13, transducers of the plurality of transducers are radially spaced along a perimeter of the band.

(A15) In some embodiments of the method of any of A13-A14, the two or more transducers are separated from one another by at least one other transducer.

(A16) In some embodiments of the method of any of A13-A14, the two or more transducers are adjacent to one another on the wearable device.

(A17) In some embodiments of the method of any of A1-A16, transducers of the plurality of transducers are spaced equidistant from one another on the wearable device.

(A18) In some embodiments of the method of any of A1-A17, the plurality of transducers is a first plurality of transducers, and the wearable device further comprises a second plurality of transducers.

In accordance with some embodiments, a wearable device includes one or more processors/cores and memory storing one or more programs configured to be executed by the one or more processors/cores. The one or more programs include instructions for performing the operations of the method described above (A1-A18). In accordance with some embodiments, a non-transitory computer-readable storage medium has stored therein instructions that, when executed by one or more processors/cores of a wearable device, cause the wearable device to perform the operations of the method described above (A1-A18). In accordance with some embodiments, a system includes a wearable device, a head-mounted display (HMD), and a computer system to provide video/audio feed to the HMD and instructions to the wearable device.

In another aspect, a wearable device is provided and the wearable device includes means for performing any of the methods described herein (A1-A18).

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 9A-9B are a different views of the wearable device of FIG. 6A generating waves in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first wearable device could be termed a second wearable device, and, similarly, a second wearable device could be termed a first wearable device, without departing from the scope of the various described embodiments. The first wearable device and the second wearable device are both wearable devices, but they are not the same wearable devices, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
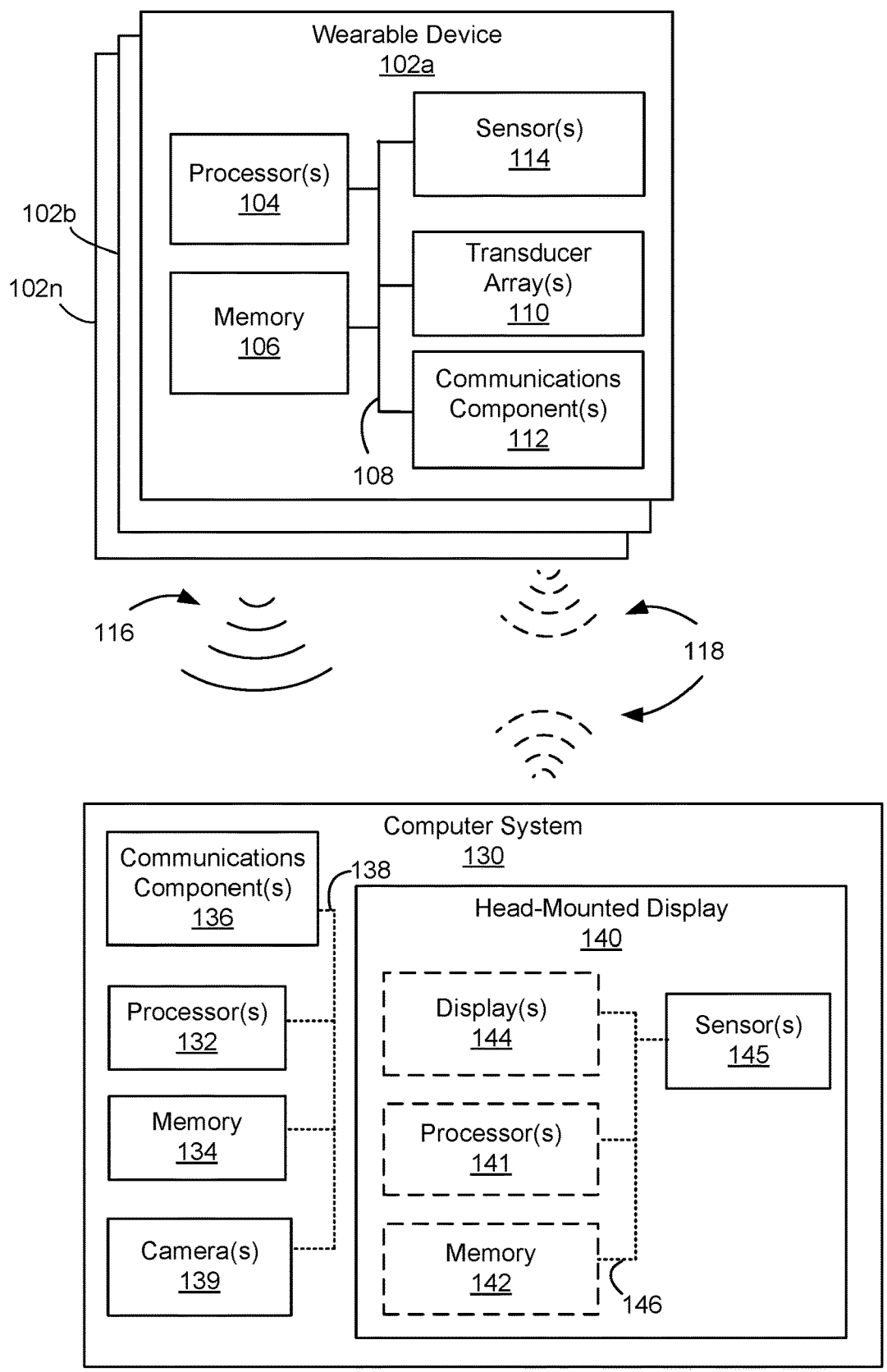
FIG. 1 is a block diagram illustrating an exemplary haptics system, in accordance with various embodiments.

FIG. 1 is a block diagram illustrating a system 100, in accordance with various embodiments. While some example features are illustrated, various other features have not been illustrated for the sake of brevity and so as not to obscure pertinent aspects of the example embodiments disclosed herein. To that end, as a non-limiting example, the system 100 includes a wearable device 102, which is used in conjunction with a computer system 130 (e.g., a host system or a host computer). In some embodiments, the system 100 provides the functionality of a virtual reality device with haptics feedback, an augmented reality device with haptics feedback, a combination thereof, or provides some other functionality. The system 100 is described in greater detail below with reference FIGS. 13-15.

An example wearable device 102 (e.g., wearable device 102a) includes, for example, one or more processors/cores 104 (referred to henceforth as "processors"), a memory 106, one or more transducer arrays 110, one or more communications components 112, and/or one or more sensors 114. In some embodiments, these components are interconnected by way of a communications bus 108. References to these components of the wearable device 102 cover embodiments in which one or more of these components (and combinations thereof) are included. In some embodiments, the one or more sensors 114 are part of the one or more transducer arrays 110 (e.g., transducers in the transducer arrays 110 also perform the functions of the one or more sensors 114, discussed in further detail below). For example, one or more transducers in the transducer array 110 may be electroacoustic transducers configured to detect acoustic waves (e.g., ultrasonic waves).

In some embodiments, a single processor 104 (e.g., processor 104 of the wearable device 102a) executes software modules for controlling multiple wearable devices 102 (e.g., wearable devices 102b . . . 102n). In some embodiments, a single wearable device 102 (e.g., wearable device 102a) includes multiple processors 104, such as one or more wearable device processors (configured to, e.g., control transmission of waves 116 by the transducer array 110), one or more communications component processors (configured to, e.g., control communications transmitted by communications component 112 and/or receive communications by way of communications component 112) and/or one or more sensor processors (configured to, e.g., control operation of sensor 114 and/or receive output from sensor 114).

The wearable device 102 is configured to generate (and receive) waves 116 (signals) via the transducer array(s) 110. In particular, the wearable device 102 is configured to generate waves 116 that stimulate areas of the wearer's body outside of (i.e., away from) the wearable device's immediate area of contact (although in some instances the generated waves can also stimulate areas of the wearer below (e.g., at) the wearable device's immediate area of contact). In some embodiments, the transducers in a respective transducer array 110 are miniature piezoelectric actuators/devices, vibrotactile actuators, or the like. In some embodiments, the transducers in a respective transducer array 110 are single or multipole voice coil motors, or the like. The transducer array(s) 110 are configured to generate and transmit waves 116 in response to being activated by the wearable device (e.g., via processors 104 or some other controller included in the wearable device 102). In some embodiments, the waves 116 are mechanical waves (e.g., sound waves, ultrasonic waves, or various other mechanical waves). A mechanical wave is an oscillation of matter, which transfers energy through a medium. As discussed herein, the "medium" is the wearer's skin, flesh, bone, blood vessels, etc. Due to an arrangement of the wearable device 102 (e.g., as shown in FIGS. 9A-9B), a wave 116 transmitted by a respective transducer in the array 110 creates oscillations or vibrations that are perpendicular to a direction of transmission. For example, if the wave 116 is transmitted along the Y-axis from the respective transducer in the array 110 (i.e., perpendicular to the medium, i.e., wearer's skin/flesh/bone), the resulting oscillations or vibrations travel along the medium in the X-axis and/or Z-axis (at least initially). In some instances, the resulting oscillations or vibrations are similar to ripples created when a stone impacts a body of water. In other instances, the resulting vibrations resemble the transmitted waves 116a, 116b (FIGS. 9A-9B), in that the transmitted wave 116 in essence turns 90 degrees upon impacting the wearer's body.

In some embodiments, the wearable device 102 adjusts one or more characteristics (e.g., waveform characteristics, such as phase, gain, direction, amplitude, and/or frequency) of waves 116 based on a variety of factors. For example, the wearable device 102 may select values of characteristics for transmitting the waves 116 to account for characteristics of a user of the wearable device. In some embodiments, the wearable device 102 adjusts one or more characteristics of the waves 116 such that the waves 116 converge at a predetermined location (e.g., a target location), resulting in a controlled constructive interference pattern. A haptic stimulation is felt by a wearer of the wearable device at the target location as a result of the controlled constructive interference pattern. In some embodiments, the wearable device 102 creates or adjusts one or more characteristics of the waves 116 in response to the user movements. Selecting values of characteristics for the waves 116 is discussed in further detail below with reference to FIG. 10.

Constructive interference of waves occurs when two or more waves 116 are in phase with each other and converge into a combined wave such that an amplitude of the combined wave is greater than amplitude of a single one of the waves. For example, the positive and negative peaks of sinusoidal waveforms arriving at a location from multiple transducers "add together" to create larger positive and negative peaks. In some embodiments, a haptic stimulation is felt (or a greatest amount is felt) by a user at a location where constructive interference of waves occurs (i.e., at the target location). Thus, to create a more intense haptic stimulation, a greater number of transducers may be activated, whereby more waves "add together." It is noted that user's may also feel the waves travelling through the medium to the target location; however, these haptic stimulations will be less noticeable relative to the haptic stimulation created and felt at the target location.

As one example, two transducers of the wearable device 102 can produce waves (i.e., vibrations) that have respective frequencies of, say, 10,000,000 and 10,000,010 Hz. In such a circumstance, the user would feel 10 Hz (i.e., would feel the beat frequency) even though the produced waves have respective frequencies of 10,000,000 and 10,000,010 Hz. In another example, if a single transducer produces a wave with a frequency of 10,000,000 Hz, but the amplitude of the wave is modulated at 10 Hz (e.g., amplitude modulation, AM), the user will feel the 10 Hz. Using this concept, multiple waves modulated at 10 Hz can be focused (i.e., constructively interfere) at a target location by using multiple transducers with waves out of phase, or by having the AM from the transducers out of phase.

As will be discussed in greater detail below, the haptic stimulation created by the wearable device 102 can correspond to visual data displayed by the head-mounted display 140. To provide some context, the visual data displayed by the head-mounted display 140 may depict an insect crawling across the wearer's hand. The wearable device 102 may create one or more haptic stimulation(s) to mimic, but not necessarily match, a feeling of the insect crawling across the wearer's hand. As one can imagine, an insect crawling across one's hand is a subtle feeling, and therefore the haptic stimulation(s) created by the wearable device would be similarly subtle. Further, as the insect moves across the wearer's hand, so would a location (or locations) of the haptic stimulation(s). As another example, the visual data displayed by the head-mounted display 140 may depict the wearer catching an object (e.g., a baseball). The wearable device 102 may create one or more haptic stimulations to induce the feeling of the object being caught by the wearer's hand (e.g., an impact of a baseball being caught is substantial, and therefore the haptic stimulations created by the wearable device 102 would be equally substantial). In yet another example, the visual data displayed by the head-mounted display 140 may depict a user in a dark cave, and therefore the user's visual sense in essence cannot be used. In such an example, the wearable device 102 may create one or more haptic stimulations to mimic sensations encountered in a cave, e.g., feeling of water dripping on the user, and/or bats flying past the user's arms, legs, and other body parts depending on the number of wearable devices 102 implemented.

Figure 8:
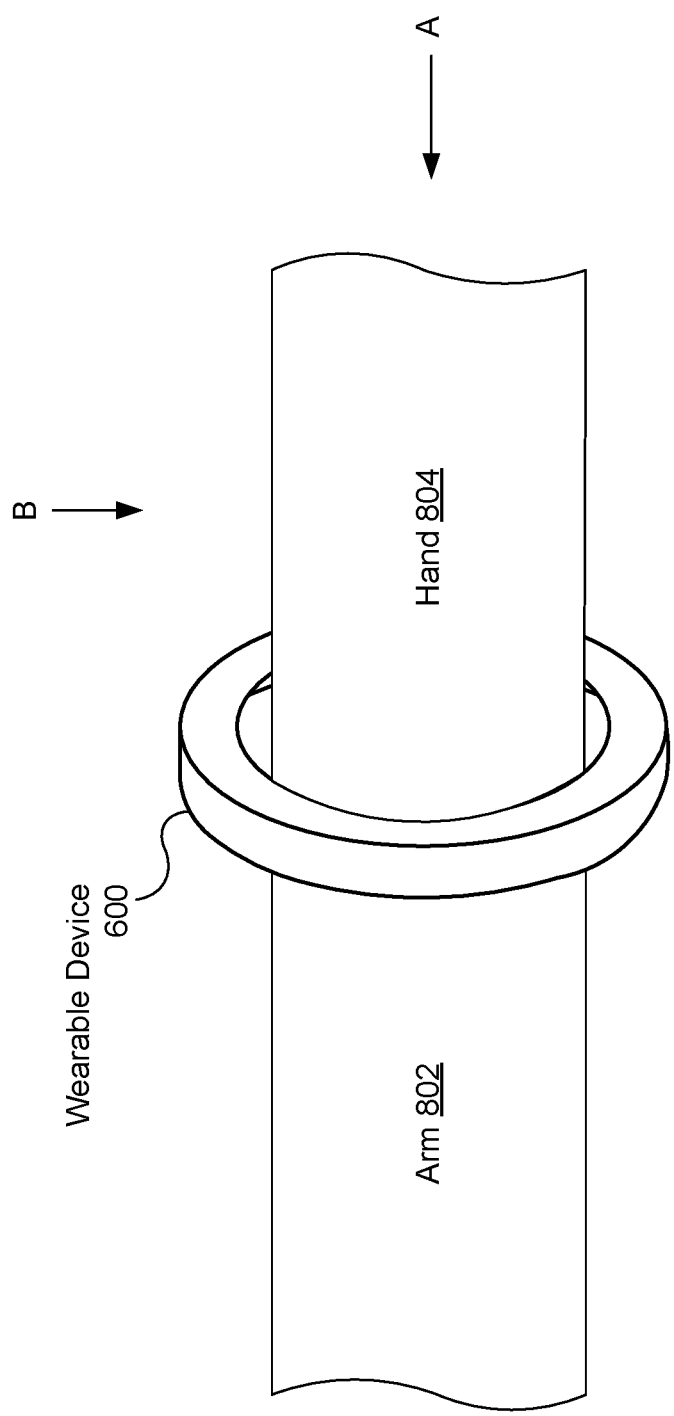
FIG. 8 illustrates the wearable device of FIG. 6A attached to a user's wrist in accordance with some embodiments.

In doing so, the wearer is further immersed into the virtual and/or augmented reality such that the wearer not only sees the insect crawling across his or her hand, but also the wearer "feels" the insect crawling across his or her hand. Moreover, the wearable device is designed to not restrict movement of the wearer's hand, as was the case with some previous haptic stimulating device. For example, as shown in FIG. 8, the wearable device 600 is attached to a wrist of the user and therefore the user's hand is unencumbered.

It is noted that the haptic stimulation created by the wearable device 102 can correspond to additional data or events (i.e., not limited to visual data displayed by the head-mounted display 140). For example, the haptic stimulation created by the wearable device 102 can correspond to physiological information of the wearer. The physiological information may be gathered by sensors 114 of the wearable device 102 (e.g., IMU, heart rate sensor, etc.) and/or sensors of other devices (e.g., sensors 145 and cameras 139). The haptic stimulation may also correspond to proprioceptive events, such as mechanical stimulations produced by the user (e.g., when the wearer taps on a virtual object). Information for mechanical stimulations can also be gathered by sensors 114 of the wearable device 102 and/or sensors of other devices (e.g., sensors 145 and cameras 139).

The computer system 130 is a computing device that executes virtual reality applications and/or augmented reality applications to process input data from the sensors 145 on the head-mounted display 140 and the sensors 114 on the wearable device 102. The computer system 130 provides output data for (i) the electronic display 144 on the head-mounted display 140 and (ii) the wearable device 102 (e.g., processors 104 of the haptic device 102, FIG. 2A). An exemplary computer system 130, for example, includes one or more processor(s)/core(s) 132, a memory 134, one or more communications components 136, and/or one or more cameras 139. In some embodiments, these components are interconnected by way of a communications bus 138. References to these components of the computer system 130 cover embodiments in which one or more of these components (and combinations thereof) are included.

In some embodiments, the computer system 130 is a standalone device that is coupled to a head-mounted display 140. For example, the computer system 130 has processor(s)/core(s) 132 for controlling one or more functions of the computer system 130 and the head-mounted display 140 has processor(s)/core(s) 141 for controlling one or more functions of the head-mounted display 140. Alternatively, in some embodiments, the head-mounted display 140 is a component of computer system 130. For example, the processor(s) 132 controls functions of the computer system 130 and the head-mounted display 140. In addition, in some embodiments, the head-mounted display 140 includes the processor(s) 141 which communicate with the processor(s) 132 of the computer system 130. In some embodiments, communications between the computer system 130 and the head-mounted display 140 occur via a wired connection between communications bus 138 and communications bus 146. In some embodiments, the computer system 130 and the head-mounted display 140 share a single communications bus. It is noted that in some instances the head-mounted display 140 is separate from the computer system 130 (not shown).

The computer system 130 may be any suitable computer device, such as a laptop computer, a tablet device, a netbook, a personal digital assistant, a mobile phone, a smart phone, a virtual reality device (e.g., a virtual reality (VR) device, an augmented reality (AR) device, or the like), a gaming device, a computer server, or any other computing device. The computer system 130 is sometimes called a host or a host system. In some embodiments, the computer system 130 includes other user interface components such as a keyboard, a touch-screen display, a mouse, a track-pad, and/or any number of supplemental I/O devices to add functionality to computer system 130.

In some embodiments, the one or more cameras 139 of the computer system 130 are used to facilitate virtual reality and/or augmented reality. Moreover, in some embodiments, the one or more cameras 139 also act as projectors to display the virtual and/or augmented images (or in some embodiments the computer system includes one or more distinct projectors). In some embodiments, the computer system 130 provides images captured by the one or more cameras 139 to the display 144 of the head-mounted display 140, and the display 144 in turn displays the provided images. In some embodiments, the processors 141 of the head-mounted display 140 process the provided images. It is noted that in some embodiments the one or more cameras 139 are part of the head-mounted display 140.

Figure 14:
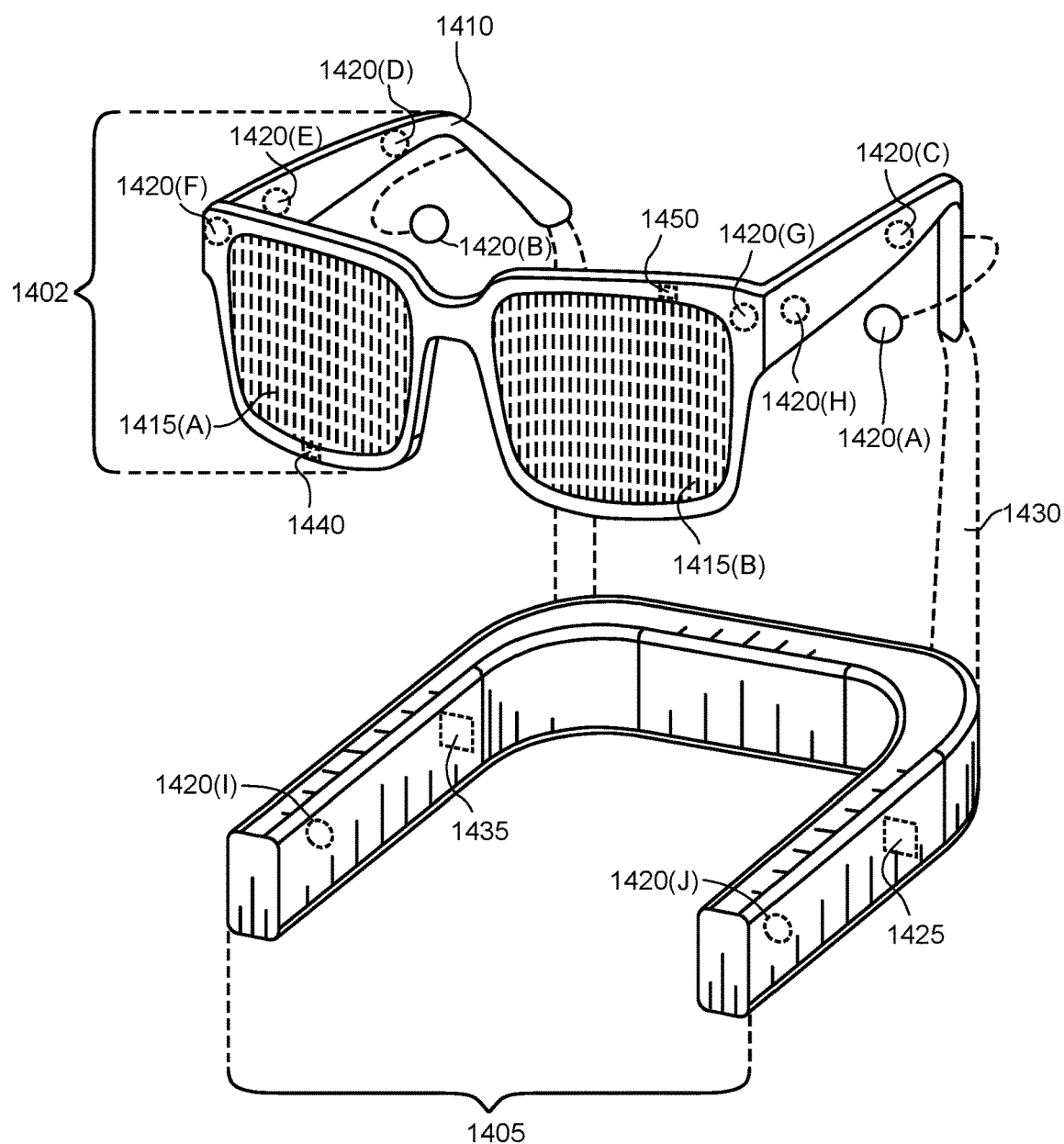
FIG. 14 illustrates an embodiment of an augmented reality headset and a corresponding neckband.
Figure 15:
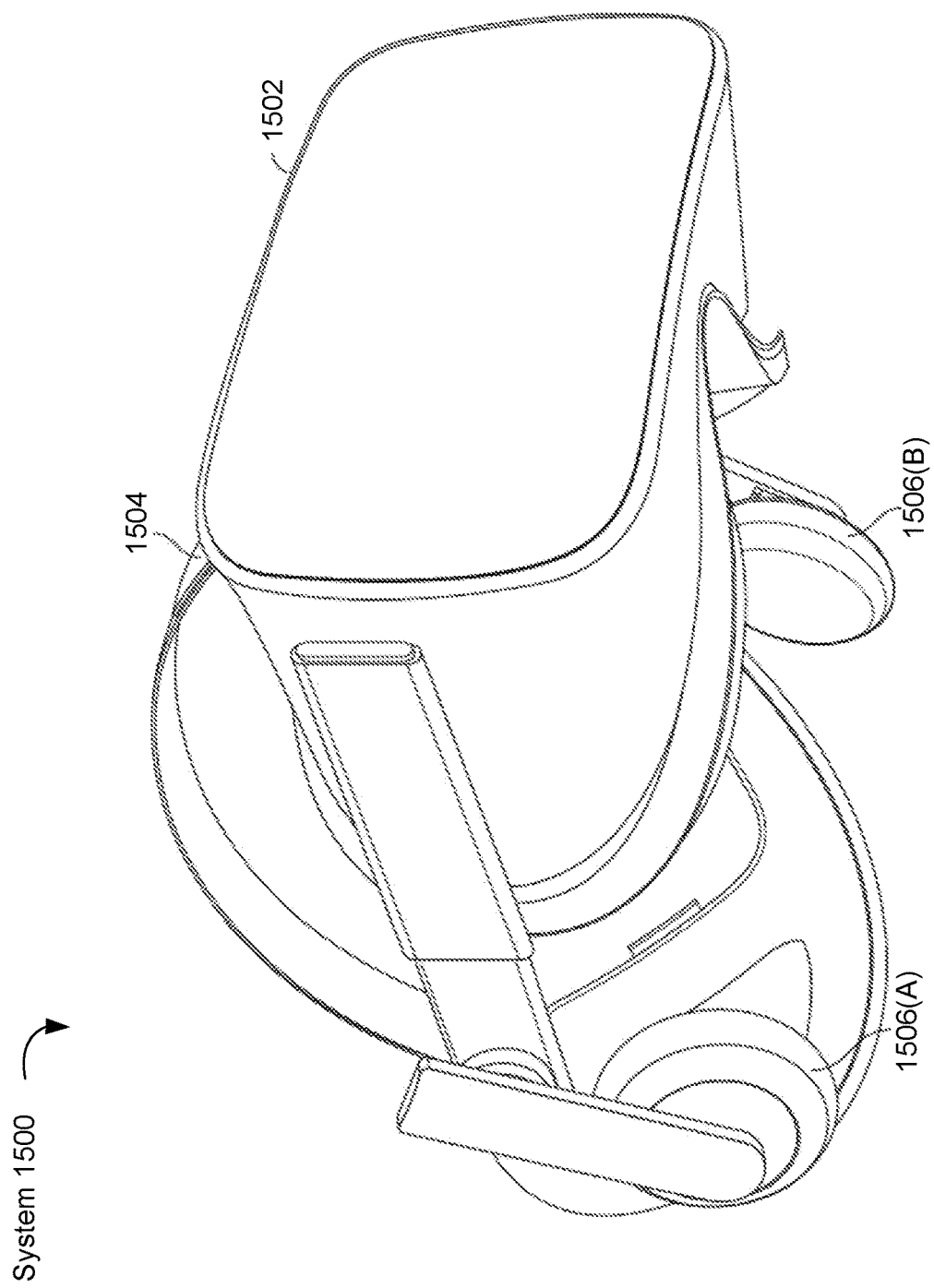
FIG. 15 illustrates an embodiment of a virtual reality headset.

The head-mounted display 140 presents media to a user. Examples of media presented by the head-mounted display 140 include images, video, audio, or some combination thereof. In some embodiments, audio is presented via an external device (e.g., speakers and/or headphones) that receives audio information from the head-mounted display 140, the computer system 130, or both, and presents audio data based on the audio information. An exemplary head-mounted display 140, for example, includes one or more processor(s)/core(s) 141, a memory 142, and/or one or more displays 144. In some embodiments, these components are interconnected by way of a communications bus 146. References to these components of the head-mounted display 140 cover embodiments in which one or more of these components (and combinations thereof) are included. It is noted that in some embodiments the head-mounted display 140 includes one or more sensors 145. Alternatively, in some embodiments, the one or more sensors 145 are part of the host system 130. FIGS. 14 and 15 illustrate additional examples (e.g., AR system 1400 and VR system 1500) of the head-mounted display 140.

The electronic display 144 displays images to the user in accordance with data received from the computer system 130. In various embodiments, the electronic display 144 may comprise a single electronic display or multiple electronic displays (e.g., one display for each eye of a user). The displayed images may be in virtual reality, augment reality, or mixed reality.

The optional sensors 145 include one or more hardware devices that detect spatial and motion information about the head-mounted display 140. Spatial and motion information can include information about the position, orientation, velocity, rotation, and acceleration of the head-mounted display 140. For example, the sensors 145 may include one or more inertial measurement units (IMUs) that detect rotation of the user's head while the user is wearing the head-mounted display 140. This rotation information can then be used (e.g., by the computer system 130) to adjust the images displayed on the electronic display 144. In some embodiments, each IMU includes one or more gyroscopes, accelerometers, and/or magnetometers to collect the spatial and motion information. In some embodiments, the sensors 145 include one or more cameras positioned on the head-mounted display 140.

In some embodiments, the transducer array 110 of the wearable device 102 may include one or more transducers configured to generate the waves 116 into a user of the wearable device, as discussed above (in some embodiments, the transducers also sense the transmitted waves). Integrated circuits (not shown) of the wearable device 102, such as a controller circuit and/or waveform generator, may control the behavior of the transducers (e.g., controller 412, FIG. 4). For example, based on the information received from the computer system 130 by way of a communication signal 118 (e.g., an instruction), a controller circuit may select values of waveform characteristics (e.g., amplitude, frequency, trajectory, direction, phase, among other characteristics) used for generating the waves 116 that would provide a sufficient haptic stimulation at a target location on the user. The controller circuit further selects, at least in some embodiments, different values of characteristics for transducers in the array 110 to effectively steer the propagated waves to the target location. In this way, the controller circuit is able to create constructive interference at the target location. The controller circuit may also identify a subset of transducers from the transducer array 110 that would be effective in transmitting the waves 116 and may in turn activate the identified set.

The communications component 112 includes a communications component antenna for communicating with the computer system 130. Moreover, the communications component 136 includes a complementary communications component antenna that communicates with the communications component 112. The respective communication components are discussed in further detail below with reference to FIGS. 2 and 3.

In some embodiments, data contained within communication signals 118 is used by the wearable device 102 for selecting values for characteristics used by the transducer array 110 to transmit the waves 116. In some embodiments, the data contained within the communication signals 118 alerts the computer system 130 that the wearable device 102 is ready for use. As will be described in more detail below, the computer system 130 sends instructions to the wearable device 102, and in response to receiving the instruction, the wearable device generates waves 116 that create the haptic stimulation(s) on the wearer of the wearable device 102.

In some embodiments, the wearable device 102 assigns a first task to a first subset of transducers of the transducer array 110, a second task to a second subset of transducers of the transducer array 110, and so on. The same transducer may be assigned to multiple subsets, including both the first and second subsets. In doing so, the different subsets perform different tasks (e.g., creating a first haptic stimulation at a first target location, creating a second haptic stimulation at a second target location, and so on). Moreover, the first task may be assigned at a first point in time and the second task may be assigned at a second point in time (or alternatively, the two tasks may be performed simultaneously).

Non-limiting examples of sensors 114 and/or sensors 145 include, e.g., infrared, pyroelectric, ultrasonic, laser, optical, Doppler, gyro, accelerometer, resonant LC sensors, capacitive sensors, heart rate sensors, acoustic sensors, and/or inductive sensors. In some embodiments, sensors 114 and/or sensors 145 are configured to gather data that is used to determine a hand posture of a user of the wearable device and/or an impedance of the medium. Examples of sensor data output by these sensors include: body temperature data, infrared range-finder data, motion data, activity recognition data, silhouette detection and recognition data, gesture data, heart rate data, and other wearable device data (e.g., biometric readings and output, accelerometer data). In some embodiments, the transducers themselves serve as sensors.

Figure 2:
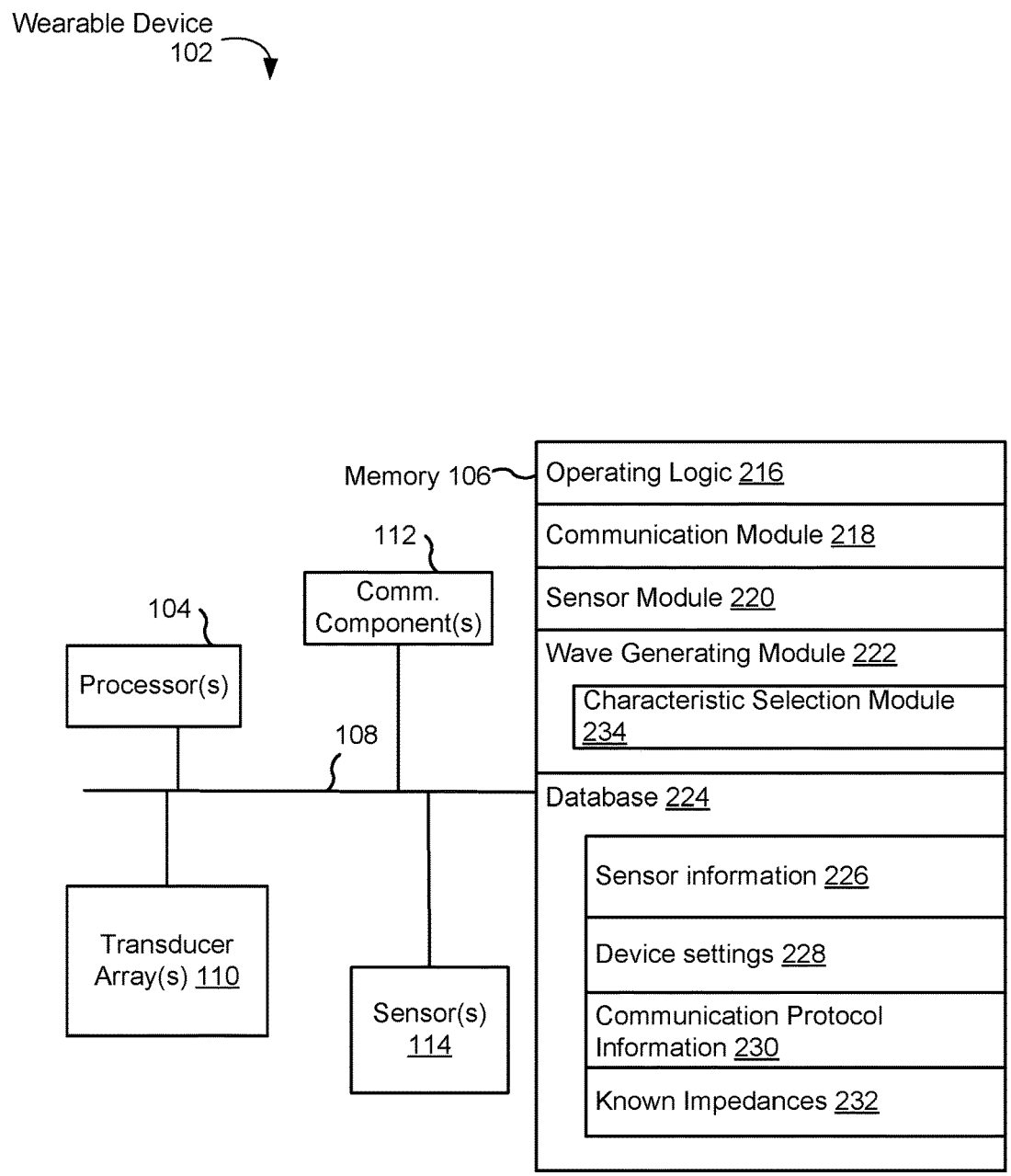
FIG. 2 is a block diagram illustrating an exemplary wearable device in accordance with some embodiments.

FIG. 2 is a block diagram illustrating a representative wearable device 102 in accordance with some embodiments. In some embodiments, the wearable device 102 includes one or more processing units (e.g., CPUs, microprocessors, and the like) 104, one or more communication components 112, memory 106, one or more transducer arrays 110, and one or more communication buses 108 for interconnecting these components (sometimes called a chipset). In some embodiments, the wearable device 102 includes one or more sensors 114 as described above with reference to FIG. 1. In some embodiments (not shown), the wearable device 102 includes one or more output devices such as one or more indicator lights, a sound card, a speaker, a small display for displaying textual information and error codes, etc.

Transducers in a respective transducer array 110 generate waves 116 (FIG. 1). In some embodiments, the one or more transducers include, e.g., hardware capable of generating the waves 116 (e.g., soundwaves, ultrasound waves, etc.). For example, each transducer can convert electrical signals into ultrasound waves. The one or more transducers may be miniature piezoelectric transducers, capacitive transducers, single or multipole voice coil motors, and/or any other suitable device for creation of waves 116. The waves 116 may be standing waves.

In some embodiments, the one or more transducers are coupled with (or include) an oscillator and/or a frequency modulator that is used to generate the waves so that the waves are appropriate for transmission. The oscillator and the frequency modulator may be part of an integrated circuit included in the wearable device 102.

The communication component(s) 112 enable communication between the wearable device 102 and one or more communication networks. In some embodiments, the communication component(s) 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

- operating logic 216 including procedures for handling various basic system services and for performing hardware dependent tasks;
- communication module 218 for coupling to and/or communicating with remote devices (e.g., computer system 130, other wearable devices, etc.) in conjunction with communication component(s) 112;
- sensor module 220 for obtaining and processing sensor data (e.g., in conjunction with sensor(s) 114 and/or transducer arrays 110) to, for example, determine an orientation of the wearable device 102 (among other purposes such as determining hand pose of the user of the wearable device);
- wave generating module 222 for generating and transmitting (e.g., in conjunction with transducers(s) 110) waves, including but not limited to creating a haptic stimulation at one or more target locations). In some embodiments, the module 222 also includes or is associated with a characteristic selection module 234 that is used to select values of characteristics for generating the waves; and
- database 224, including but not limited to:
  - sensor information 226 for storing and managing data received, detected, and/or transmitted by one or more sensors (e.g., sensors 114, one or more remote sensors, and/or transducers);
  - device settings 228 for storing operational settings for the wearable device 102 and/or one or more remote devices (e.g., selected values for characteristics of the waves);
  - communication protocol information 230 for storing and managing protocol information for one or more protocols (e.g., custom or standard wireless protocols, such as ZigBee, Z-Wave, etc., and/or custom or standard wired protocols, such as Ethernet); and
  - known impedances 232 for storing impedances for various users of the wearable device.

In some embodiments, the characteristic selection module 234 of the wave generating module 222 may be used to select a particular frequency at which to transmit the waves. As discussed above, other characteristics for waves may include phase, gain, amplitude, direction, and the selection module 234 may select particular values for each of those characteristics. In some embodiments, the selection module 234 selects the values based on information received from the computer system 130 (as explained greater detail below). In some embodiments, the computer system 130 includes the selection module 234 and provides the relevant characteristics to the wearable device 102.

In some embodiments (not shown), the wearable device 102 includes a location detection device, such as a GNSS (e.g., GPS, GLONASS, etc.) or other geo-location receiver, for determining the location of the wearable device 102. Further, in some embodiments, the wearable device 102 includes location detection module (e.g., a GPS, Wi-Fi, magnetic, or hybrid positioning module) for determining the location of the wearable device 102 (e.g., using the location detection device) and providing this location information to the host system 130.

In some embodiments (not shown), the wearable device 102 includes a unique identifier stored in database 224. In some embodiments, the wearable device 102 sends the unique identifier to the host system 130 to identify itself to the host system 130. This is particularly useful when multiple wearable devices are being concurrently used.

In some embodiments, the wearable device 102 includes one or more inertial measurement units (IMU) for detecting motion and/or a change in orientation of the wearable device 102. In some embodiments, the detected motion and/or orientation of the wearable device 102 (e.g., the motion/ change in orientation corresponding to movement of the user's hand) is used to manipulate an interface (or content within the interface) displayed by the head-mounted display 140. In some embodiments, the IMU includes one or more gyroscopes, accelerometers, and/or magnetometers to collect IMU data. In some embodiments, the IMU measures motion and/or a change in orientation for multiple axes (e.g., three axes, six axes, etc.). In such instances, the IMU may include one or more instruments for each of the multiple axes. The one or more IMUs may be part of the one or more sensors 114.

Each of the above-identified elements (e.g., modules stored in memory 106 of the wearable device 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above.

Figure 3:
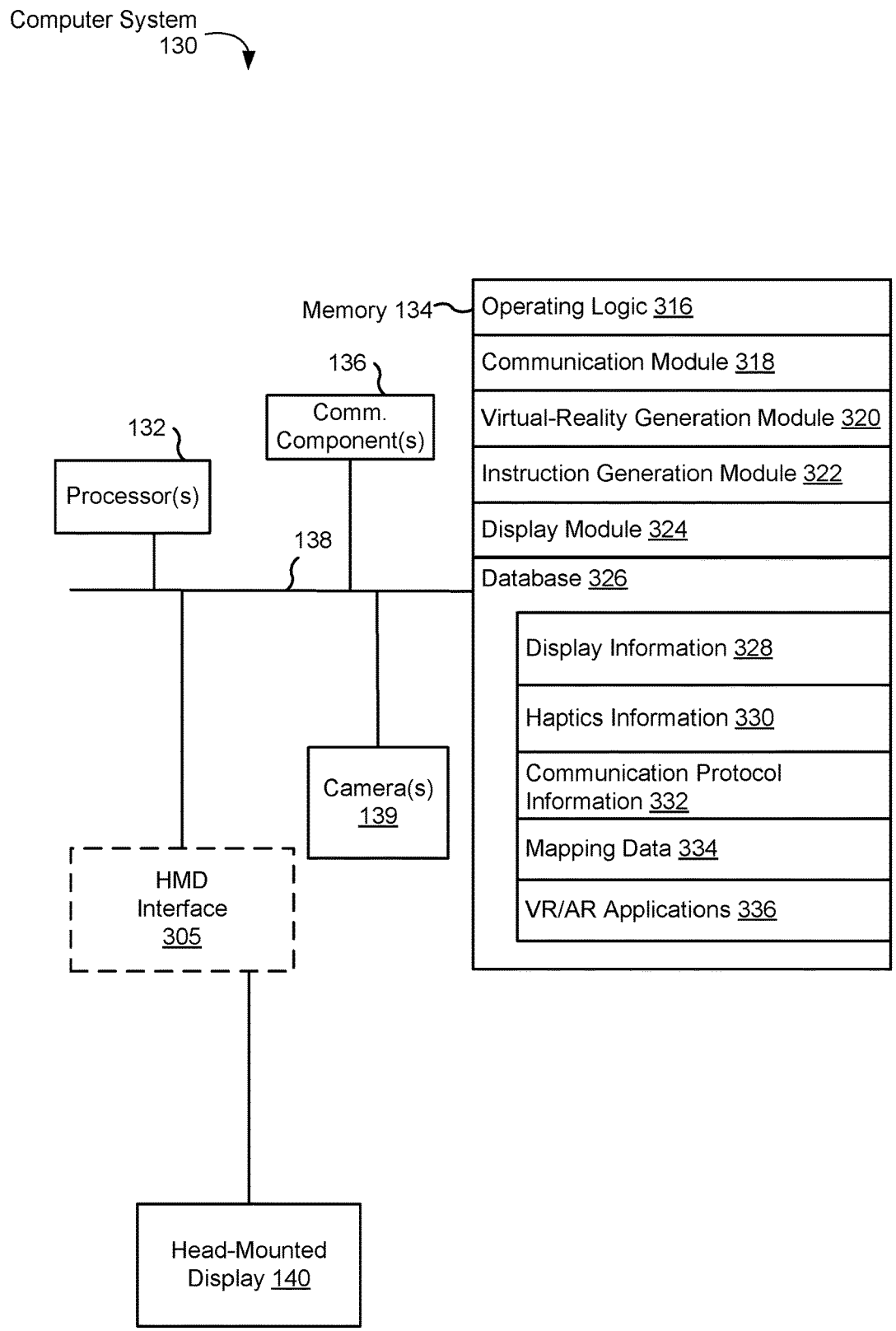
FIG. 3 is a block diagram illustrating an exemplary computer system in accordance with some embodiments.

FIG. 3 is a block diagram illustrating a representative computer system 130 in accordance with some embodiments. In some embodiments, the computer system 130 includes one or more processing units/cores (e.g., CPUs, GPUs, microprocessors, and the like) 132, one or more communication components 136, memory 134, one or more cameras 139, and one or more communication buses 308 for interconnecting these components (sometimes called a chipset). In some embodiments, the computer system 130 includes a head-mounted display interface 305 for connecting the computer system 130 with the head-mounted display 140. As discussed above in FIG. 1, in some embodiments, the computer system 130 and the head-mounted display 140 are together in a single device, whereas in other embodiments the computer system 130 and the head-mounted display 140 are separate from one another.

Although not shown, in some embodiments, the computer system (and/or the head-mounted display 140) includes one or more sensors 145 (as discussed above with reference to FIG. 1).

The communication component(s) 136 enable communication between the computer system 130 and one or more communication networks. In some embodiments, the communication component(s) 136 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

The memory 134 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 134, or alternatively the non-volatile memory within memory 134, includes a non-transitory computer-readable storage medium. In some embodiments, the memory 134, or the non-transitory computer-readable storage medium of the memory 134, stores the following programs, modules, and data structures, or a subset or superset thereof:

- operating logic 316 including procedures for handling various basic system services and for performing hardware dependent tasks;
- communication module 318 for coupling to and/or communicating with remote devices (e.g., wearable devices 102a-102-n, a remote server (not shown), etc.) in conjunction with communication component(s) 136;
- virtual-reality generation module 320 that is used for generating virtual-reality images and sending corresponding video and audio data to the HMD 140 (in some embodiments, the virtual-reality generation module 320 is an augmented-reality generation module 320 (or the memory 134 includes a distinct augmented-reality generation module) that is used for generating augmented-reality images and projecting those images in conjunction with the camera(s) 139 and the HMD 140);
- instruction module 322 that is used for generating an instruction that, when sent to the wearable device 102 (e.g., using the communications component 136), causes the wearable device 102 to activate two or more transducers;
- display module 324 that is used for displaying virtual-reality images and/or augmented-reality images in conjunction with the head-mounted display 140 and/or the camera(s) 139;
- database 326, including but not limited to:
  - display information 328 for storing virtual-reality images and/or augmented-reality images (e.g., visual data);
  - haptics information 330 for storing haptics information that corresponds to the stored virtual-reality images and/or augmented-reality images;
  - communication protocol information 332 for storing and managing protocol information for one or more protocols (e.g., custom or standard wireless protocols, such as ZigBee, Z-Wave, etc., and/or custom or standard wired protocols, such as Ethernet); and
  - mapping data 334 for storing and managing mapping data (e.g., mapping one or more wearable devices 102 on a user).

In the example shown in FIG. 3, the computer system 130 further includes virtual-reality (and/or augmented-reality) applications 336. In some embodiments, the virtual-reality applications 336 are implemented as software modules that are stored on the storage device and executed by the processor. Each virtual-reality application 336 is a group of instructions that, when executed by a processor, generates virtual reality content for presentation to the user. A virtual-reality application 336 may generate virtual-reality content in response to inputs received from the user via movement of the head-mounted display 140 or the wearable device 102. Examples of virtual-reality applications 336 include gaming applications, conferencing applications, and video playback applications.

The virtual-reality generation module 320 is a software module that allows virtual-reality applications 336 to operate in conjunction with the head-mounted display 140 and the wearable device 102. The virtual-reality generation module 320 may receive information from the sensors 145 on the head-mounted display 140 and may, in turn provide the information to a virtual-reality application 336. Based on the received information, the virtual-reality generation module 320 determines media content to provide to the head-mounted display 140 for presentation to the user via the electronic display 144. For example, if the virtual-reality generation module 320 receives information from the sensors 145 on the head-mounted display 140 indicating that the user has looked to the left, the virtual-reality generation module 320 generates content for the head-mounted display 140 that mirrors the user's movement in a virtual environment.

Similarly, in some embodiments, the virtual-reality generation module 320 receives information from the sensors 114 on the wearable device 102 and provides the information to a virtual-reality application 336. The application 336 can use the information to perform an action within the virtual world of the application 336. For example, if the virtual-reality generation module 320 receives information from the sensors 114 that the user has raised his hand, a simulated hand (e.g., the user's avatar) in the virtual-reality application 336 lifts to a corresponding height. As noted above, the information received by the virtual-reality generation module 320 can also include information from the head-mounted display 140. For example, cameras 139 on the head-mounted display 140 may capture movements of the user (e.g., movement of the user's arm), and the application 336 can use this additional information to perform the action within the virtual world of the application 336.

To further illustrate with an augmented reality example, if the augment-reality generation module 320 receives information from the sensors 114 that the user has rotated his forearm while, in augmented reality, a user interface (e.g., a keypad) is displayed on the user's forearm, the augmented-reality generation module 320 generates content for the head-mounted display 140 that mirrors the user's movement in the augmented environment (e.g., the user interface rotates in accordance with the rotation of the user's forearm).

Each of the above identified elements (e.g., modules stored in memory 134 of the computer system 130) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 134, optionally, stores a subset of the modules and data structures identified above.

Figure 4:
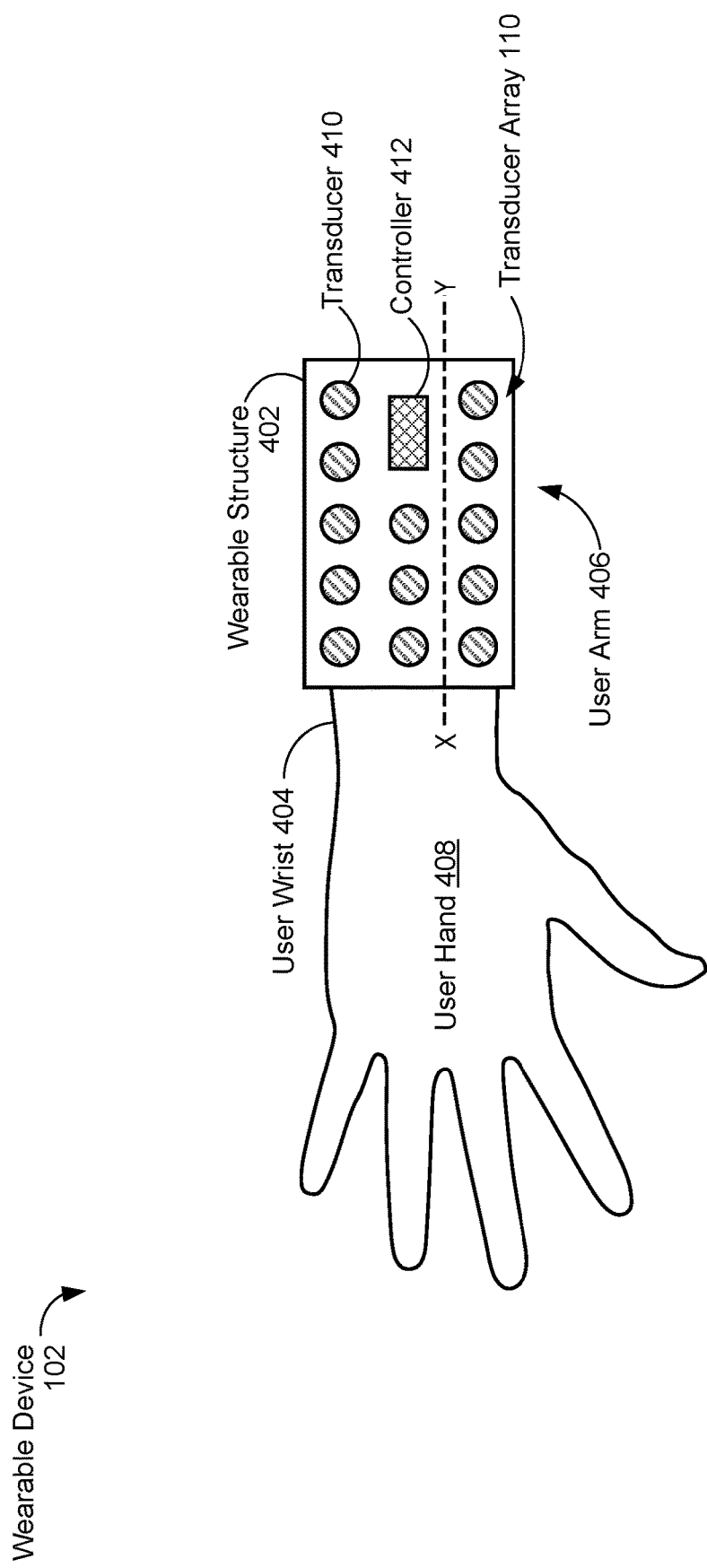
FIG. 4 is an exemplary view of a wearable device on a user's wrist, in accordance with some embodiments.

FIG. 4 is an example view 400 of the wearable device 102 in accordance with some embodiments. The view 400 shows the user's hand 408, user's wrist 404, user's arm 406, and the wearable device 102 on the user's arm 406. Such an arrangement is merely one possible arrangement, and one skilled in the art will appreciate that the discussion herein is not limited to the arrangement shown in FIG. 4.

The wearable device 102 includes a wearable structure 402 that may be a flexible mechanical substrate such as a plastic (e.g., polyethylene or polypropylene), rubber, nylon, synthetic, polymer, etc. In some embodiments, the wearable structure 402 is configured to be worn around at least a portion of a user's wrist or arm 404/406 (and various other body parts). The wearable device 102 includes a transducer array 110, including a plurality of transducers 410 arranged at different locations on the wearable structure 402. The transducers 410 can be arranged in a pattern along an inner surface of the wearable structure 402 facing the arm 406 such that the transducers 410 contact the user's skin. In another example, the transducers can be arranged in a radial pattern along an inner perimeter of the wearable structure 602 (FIG. 6B).

Transducer 410 generates waves (e.g., waves 116, FIG. 1) in response to receiving one or more control signals from a controller 412. The one or more control signals instruct one or more transducers 410 in the transducer array 110 to send waves (e.g., ultrasonic waves) into the user's wrist or arm. In some embodiments, the wearable device 102 includes one or more sensors (e.g., sensors 114, FIG. 1) mounted on the wearable structure 402 to measure impedance of the user's wrist or arm. In some embodiments, the wearable structure 402 includes a memory (e.g., memory 106, FIG. 1) that stores known impedances of a user (or multiple users), as discussed above. In some embodiments, the controller 412 generates a control signal (or multiple signals) based on an instruction from a host system (e.g., computer system 130, FIG. 1). In some embodiments, the instruction from the host system is based on information received from one or more sensors of the wearable device 102 (e.g., based on information from the optional IMU and/or information from the sensors 114, such as a heart rate sensor). Alternatively or in addition, the controller 412 may generate a control signal (or multiple signals) based on information received from one or more sensors of the wearable device 102

The wearable device 102 is placed on a user's arm 406 to send haptic stimulation to the user. For example, haptic stimulation (e.g., tactile feedback) includes a touch stimulation, a swipe stimulation, a pull stimulation, a push stimulation, a rotation stimulation, a heat stimulation, and/or a pain stimulation. In some embodiments, each transducer 410 on the wearable device 102 functions individually to create the haptic stimulation. Alternatively, in some embodiments, two or more transducers function together to create the haptic stimulation. In some embodiments, less than all the transducers function to create the haptic stimulation. For example, a first group of transducers (two or more transducers) may function to create first haptic stimulation at a first location and a second group of transducers (two or more different transducers) may function to create second haptic stimulation at a second location. In some embodiments, a threshold number of transducers is needed to create the haptic stimulation. For example, two or more transducers need to generate ultrasonic waves in order for the haptic stimulation to be felt by a user of the wearable device. In some embodiments, a magnitude of the haptic stimulation felt by the user increases as the number of transducers generating ultrasonic waves increases.

As discussed above, oscillations or vibrations travel along (e.g., within) the wearer's body as a result of a wave 116 being generated by a transducer 410. The resulting oscillations or vibrations from the wave 116 are sometimes referred to herein as crawling waves (the "crawling wave phenomena"). In the present context, the crawling wave phenomena refers to two or more sources (i.e., transducers) with different harmonic/acoustic excitations that induce moving interference patterns in the wearer's body. The crawling wave generated by the sources moves through the wearer's body with a phase velocity (v) that depends on the harmonic frequencies (f1, f2), and the shear wave speed (s). In some embodiments, the following equation represents the phase velocity (v) of a crawling wave:

$$v = s(f1 - f2)/\sqrt{4f1 * f2}$$

As an example, when f1=500 Hz, f2=501 Hz, s=5 m/s, a phase velocity of v≈1 cm/s results. In some embodiments, values for the parameters of the equation above are provided by the computer system 130, or the values are calculated by the wearable device 102 based on an instruction from the computer system 130.

Figure 12:
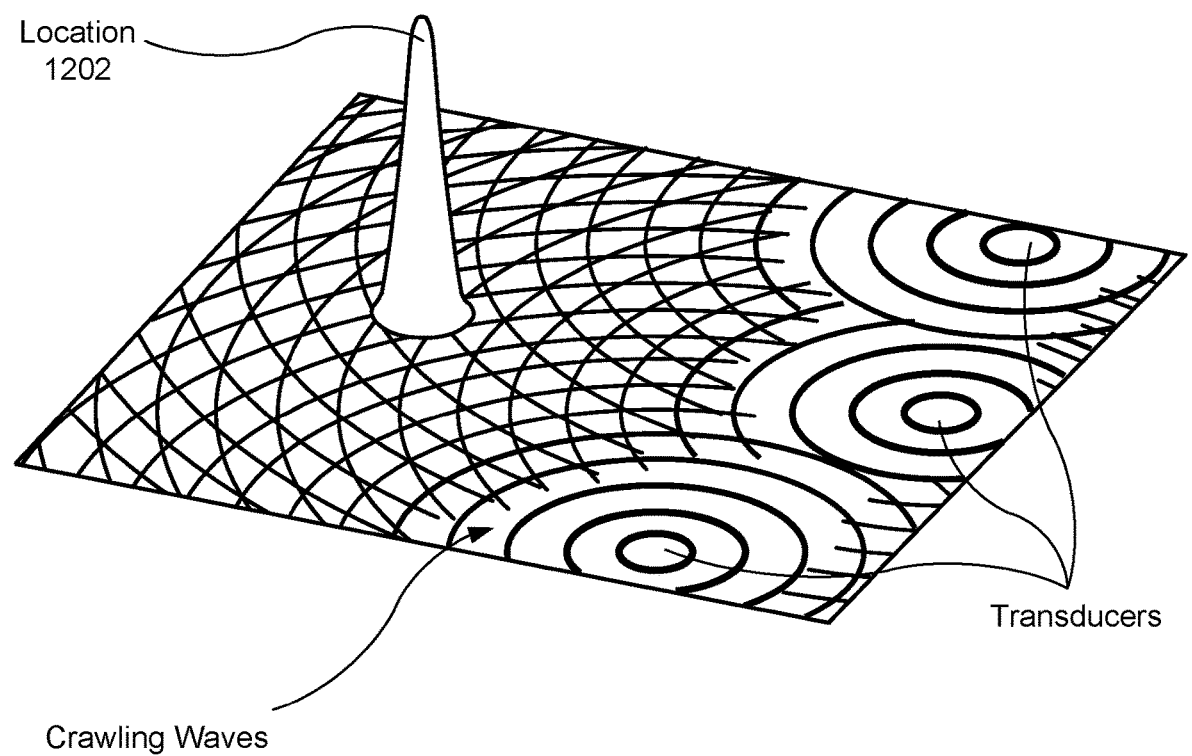
FIG. 12 illustrates multiple crawling waves constructively interfering with one another.

An example of multiple crawling waves constructively interfering with one another is illustrated in FIG. 12 (view B). As shown, the crawling waves constructively interfere at location 1202, which corresponds to a haptic stimulation. In some embodiments, time reversal focusing techniques are used to determine parameters of the crawling waves illustrated in FIG. 12, as explained below. For example, the determined parameters are used to create the haptic stimulation at location 1202 (FIG. 12).

In some embodiments, the transducers 410 focus ultrasound waves into the user using time reversal signal processing. In other words, the wearable device is a device that can focus waves using a time reversal method. Time reversal signal processing takes advantage of wave reciprocity, which is not altered by non-linear media, such as the user's skin. To focus the ultrasound waves using time reversal techniques, for each of the transducers 410, the wearable device activates the respective transducers (e.g., each transducer shown in FIG. 12) with a test signal and measures the response at the respective target location (e.g., location 1202, FIG. 12). Various instruments can be used to measure the response at the respective target location, including but not limited to a laser Doppler vibrometer. Thereafter, the measured signals are time-reversed. By activating the transducers 410 (e.g., all or less than all) with time-reversed versions of the measured signals, an excited skin (or other media) response can be created at the target location (e.g., the signals constructively interfere at the target location). As one skilled in the art will appreciate, in some instances, the parameters of each crawling wave are the same, whereas in some other instances, the parameters of crawling waves differs. Moreover, a first transducer may be activated at a first time and a second transducer may be activated at a second time (e.g., after the first time) (or in some embodiments, each transducer is activated simultaneously).

Figure 5:
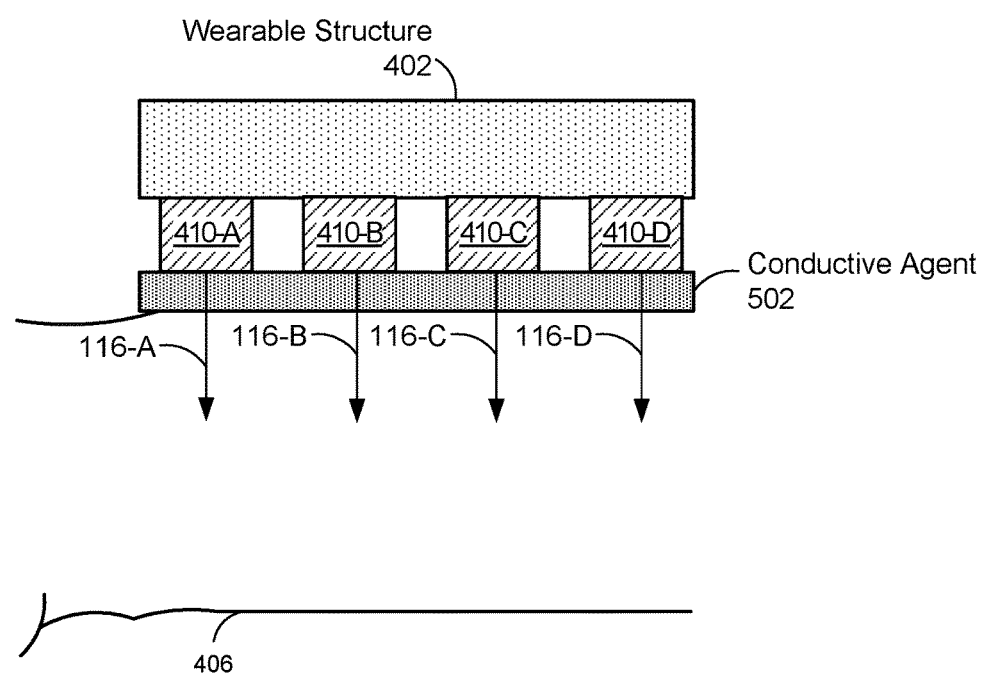
FIG. 5 is an exemplary cross-sectional view of a wearable device on the user's wrist in accordance with some embodiments.

In some embodiments, the transducer array 110 includes transducers 410 designed to make contact with human skin. A contact area having a conductive agent and padding may be used on the wearable device 102 behind each transducer to improve subject comfort and reduce contact impedances (e.g., as shown in FIG. 5). The conductive agent between the transducer and skin may be a "wet" connection using a conductive gel, which may consist of propylene glycol and NaCl, or a "dry" connection, such as a thin layer of conductive polymer (e.g., carbon-doped PDMS).

FIG. 5 is an example cross section 500 of a wearable device in accordance with some embodiments (taken along line X-Y, FIG. 4). The cross sectional view 500 shows the wearable device 102 on a user's arm 406, as described above in FIG. 4. As shown, each transducer generates and transmits a wave 116a-116d (e.g., an ultrasonic wave) in the user's arm 406. The conductive agent 502 reduces the impedance presented to the waves 116 at the contact between the transducers 410 and the skin of the arm 406.

As shown, the transmitted waves 116a-116d extend into the user's body (e.g., extend into the epidermis, the dermis, the muscles, the tendons, the ligaments, the bones, etc.). In some embodiments, the impact of the transmitted waves 116a-116d causes crawling waves to radiate away from the impact locations using the user's body as a medium (e.g., as shown in FIG. 12). Although the waves 116a-116d are shown travelling a minimal distance into the user's body, in some instances the waves 116a-116d travel at least half way through the body (e.g., to the bone).

Figure 6A:
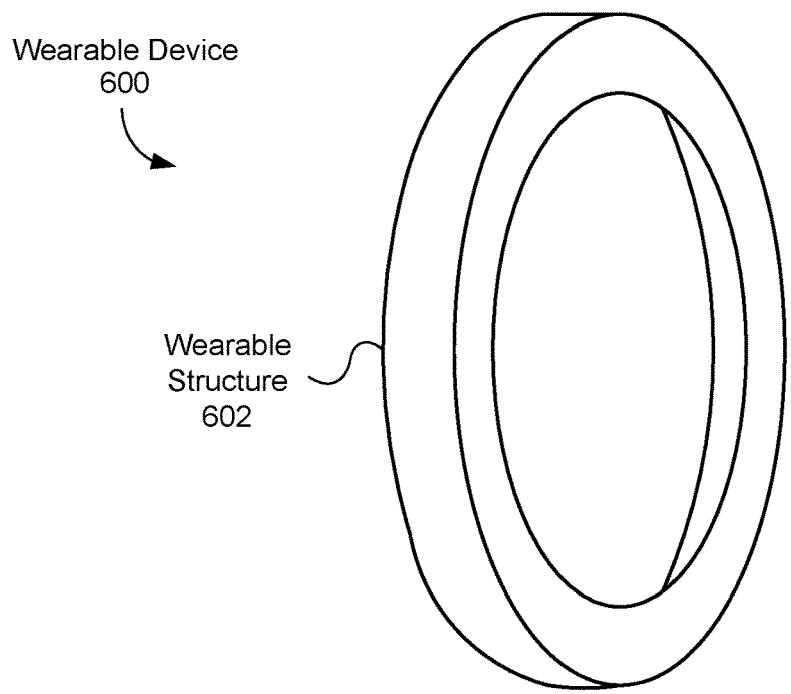
FIGS. 6A-6B are exemplary views of a wearable device in accordance with some embodiments.
Figure 6B:
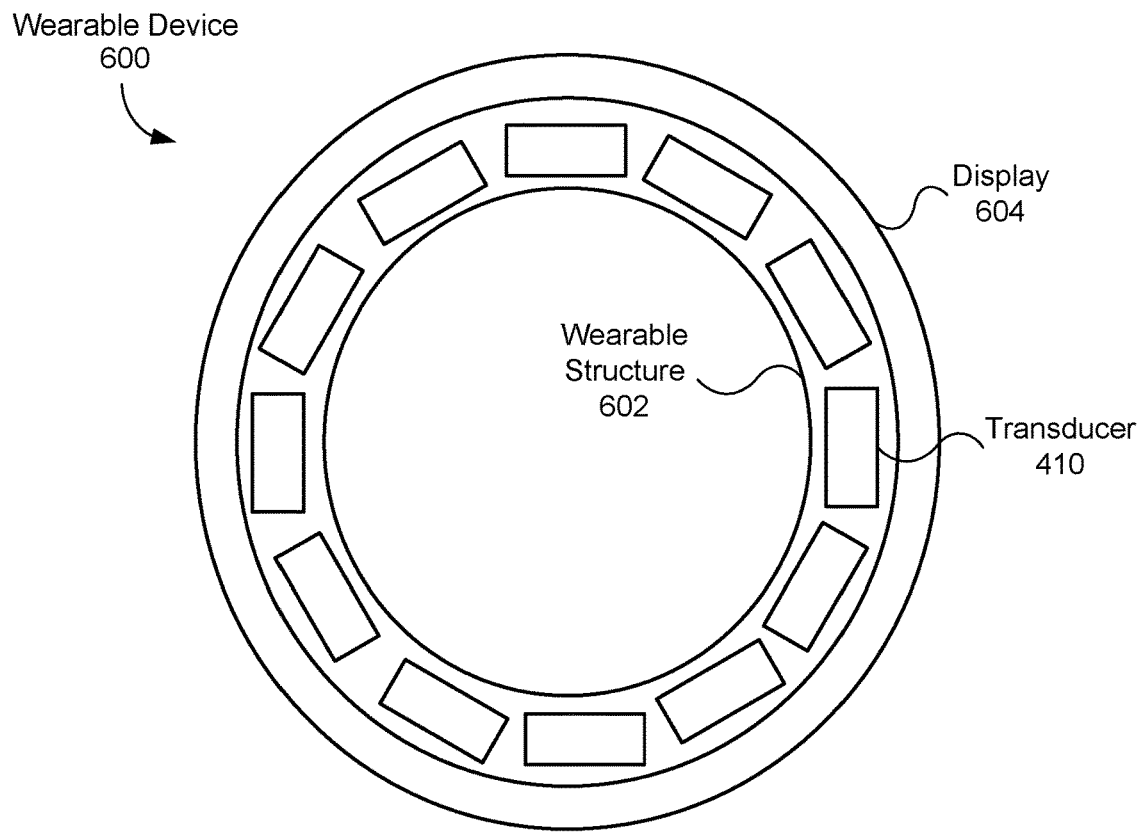

FIG. 6A is an isometric view of the wearable device 600 in accordance with some embodiments. The wearable device 600 is an example of the wearable device 102. The wearable device 600 is configured to be attached to a part of a user's body. For example, the wearable device 600 is configured to be attached to a wrist, forearm, ankle, bicep, calf, thigh, and various other parts of the user's body. In some embodiments, the wearable device 600 is a rigid or semi-rigid structure. Alternatively, in some embodiments, the wearable device 102 is a flexible structure. Although the wearable device 600 is shown as a continuous circle, the wearable device 600 may break apart to be attached to the user's body (e.g., in a similar fashion to a watch).

FIG. 6B is a cross-sectional view of the wearable device 600 in accordance with some embodiments. The wearable device 600 includes a wearable structure 602. The wearable structure 602 wraps around the part of the user's body. The wearable device 600 further includes a plurality of transducers 410 (FIG. 4) positioned along an inner perimeter of the wearable structure 602. The transducers 410 in this example are radially spaced, such that the transducers 410 wrap around the wearable structure 602 and form a substantially contiguous circle of transducers. In such an arrangement, the wearable device 600 is able to produce waves 116 in a 360-degree fashion. In some embodiments, the structure 602 separates the transducers 410 from the user's skin. Alternatively, in some embodiments (not shown), the transducers 410 are in direct contact with the user's skin (a conductive agent may also be included, as described above with reference to FIG. 5).

Figure 7A:
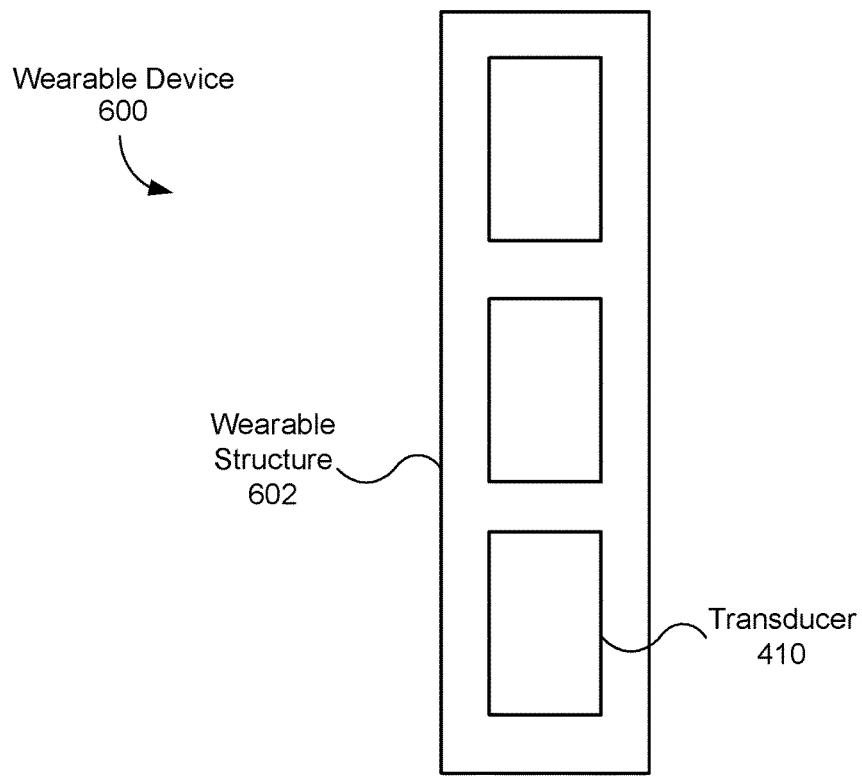
FIGS. 7A-7B are cross-sectional views of the wearable device of FIG. 6A in accordance with some embodiments.
Figure 7B:
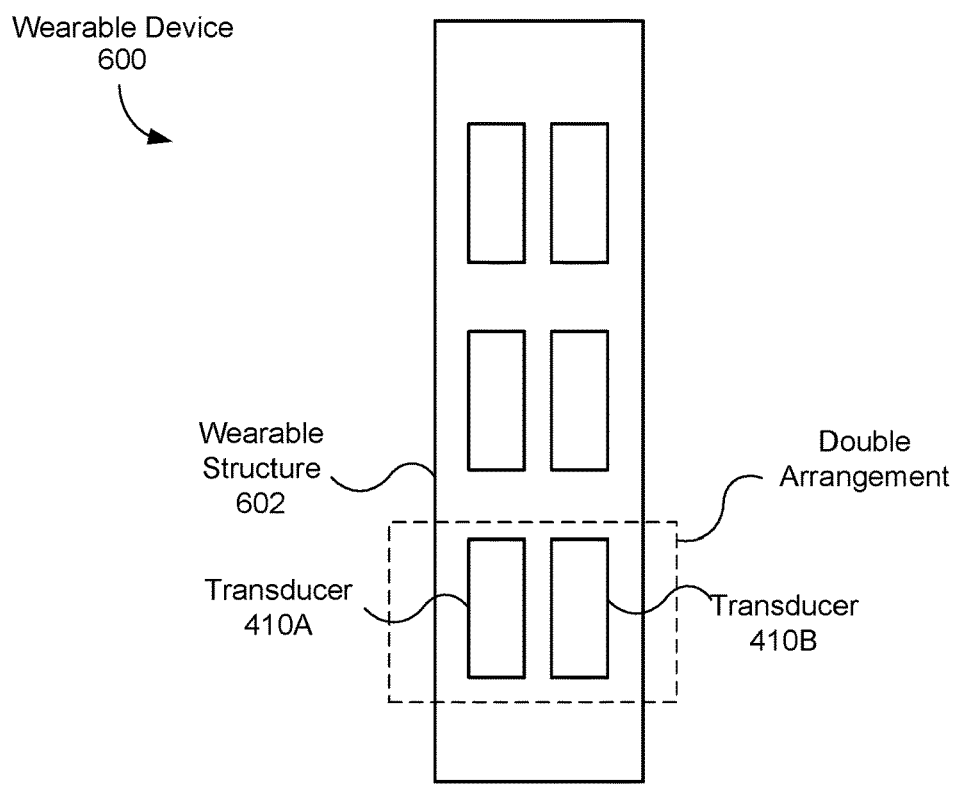

FIGS. 7A-7B are cross-sectional views of the wearable device 600 in accordance with some embodiments. FIG. 7A illustrates a single arrangement of transducers 410 along a length of the wearable structure 602. FIG. 7B illustrates a double arrangement of transducers 410A, 410B along the length of the wearable structure 602 (other arrangements are possible, such as a triple arrangement). In some embodiments (not shown), the transducers are staggered such that transducers in a given row are not parallel, but are instead offset from one another.

FIG. 8 illustrates the wearable device 600 attached to a user's wrist. Left of the wearable device 600 is the user's arm 802 and right of the wearable device 600 is the user's hand 804. The wearable device 600 could also be attached to a user's ankle, or various other body parts.

FIG. 9A is a cross-sectional view 900 of the wearable device 600 taken along "A" view, in accordance with some embodiments. The user's arm has been removed from FIG. 9A for ease of illustration. As shown, two transducers 410A, 410B from the transducer array 110 are activated (indicated by shading), and each is generating a respective wave 116a, 116b. In some embodiments, the wearable device 600 selectively activates a subset of the transducer array 110 based at least in part on a desired target location. In this example, the target location 912 is towards an upper portion of the user's hand 804. Accordingly, the wearable device 600 selectively activates the two shaded transducers 410A and 410B (it is noted that the displayed selection is merely used for illustrative purposes). In response to being activated, the two transducers 410A and 110B each generates a wave 116a, 116b into the user's body directly below the wearable device 102 (i.e., the generated waves 116a, 116b, at least initially, travel perpendicular to the user's skin). As will be explained with reference to FIG. 9B, the generated waves end up travelling parallel to the user's body after initially travelling perpendicular to the user's body.

FIG. 9B is an example top view 902 that shows the wearable device 600 and the user's arm taken along "B" view, in accordance with some embodiments. As shown, the two waves 116a, 116b generated by the two transducers parallel the user's body and are using the arm as the medium. The two waves 116a, 116b, after initially travelling perpendicular to the user's arm, travel parallel to the user's body after contacting and interacting with the user's body. The two waves 116a, 116b propagate within a sublayer of the body away from an impact location. In some embodiments, a direction of the two waves 116a, 116b is different, such as normal to and tangential with the skin, which can lead to different conduction velocities and attenuation. For example, one of the waves may initially travel perpendicular to the user's arm while another wave may initially travel parallel to the user's arm.

Values of characteristics of each wave are selected by the wearable device 600 (or the host system 130) so that the two waves 116a, 116b constructively interfere at the target location 912. It is noted that the two waves 116a, 116b in FIG. 9B are shown as being substantially sinusoidal in shape. However, in some instances, the two waves 116a, 116b resemble ripples on a body of water (e.g., as shown in FIG. 12). For example, the first wave 116a creates a first ripple that propagates within a sublayer of the body away from the impact location and the second wave 116b creates a second ripple that propagates within a sublayer of the body away from the impact location. Based on the characteristics of the ripples, the propagation medium, and a spacing of the two impact locations, the two waves 116a, 116b constructively interfere at the target location 912.

As will be explained in more detail below with reference to FIG. 10, values for the characteristics of the waves are selected based at least in part on characteristics of the user and the target location.

Figure 10:
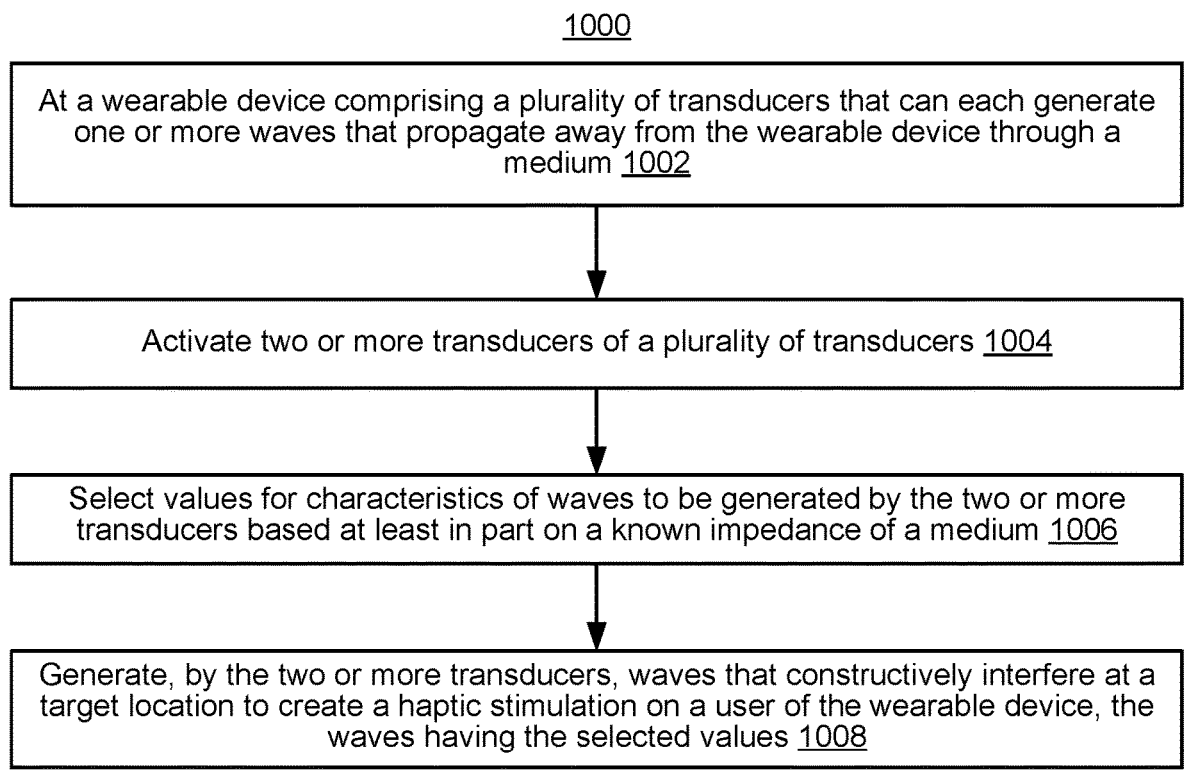
FIG. 10 is a flow diagram illustrating a method of creating localized haptic stimulations in accordance with some embodiments.

FIG. 10 is a flow diagram illustrating a method 1000 of creating localized haptic stimulations on a user in accordance with some embodiments. The steps of the method 1000 may be performed by a wearable device (e.g., a wearable device 102, FIG. 1). FIG. 10 corresponds to instructions stored in a computer memory or computer readable storage medium (e.g., memory 106 of the wearable device 102). For example, the operations of method 1000 are performed, at least in part, by a communication module (e.g., communication module 218, FIG. 2), a wave generating module (e.g., wave generating module 222, FIG. 2), and/or characteristics selection module (e.g., characteristics selection module 236, FIG. 2).

The method 1000 is performed at a wearable device that includes a plurality of transducers (e.g., transducer array 110, FIG. 1), where each transducer generates one or more waves (e.g., waves 116, FIG. 1) that propagate away from the wearable device through a medium. In some embodiments, the transducers are an array of miniature piezoelectric devices. Alternatively or in addition, in some embodiments, the transducers are an array of single or multipole voice coil motors. In some embodiments, the one or more waves are mechanical waves, such as ultrasonic waves, soundwaves, or the like. In some embodiments, the one or more waves are electromagnetic waves, or various other waves. In some embodiments, the medium is skin (or flesh, bone, etc.) of a user wearing the wearable device. For example, the wearable device may be attached to a wrist of the user, and the one or more waves may propagate away from the wearable device through the skin below the wearable device. In some embodiments, the plurality of transducers contacts the user's skin. In some embodiments, the wearable device further includes a band (e.g., wearable structure 402, FIG. 4; wearable structure 602, FIG. 6A) to be secured around a wrist (or other body part) of the user, and each of the plurality of transducers is coupled to (e.g., integrated with) the band. In some embodiments, the plurality of transducers is radially spaced along a perimeter of the band (e.g., transducer arrangement shown in FIG. 6B). In some embodiments, the wearable device includes a housing that houses the components of the wearable device.

The method 1000 includes activating (1004) two or more transducers of a plurality of transducers (e.g., transducers 410A and 410B, FIG. 9A). In some embodiments, a controller (e.g., controller 412, FIG. 4) performs the activating. In some embodiments, the controller is part of the wearable device. Alternatively, in some embodiments, the controller is part of the host system 130 (FIG. 1). In some embodiments, activating the two or more transducers comprises activating the two or more transducers simultaneously. Alternatively, in some embodiments, activating the two or more transducers comprises: (i) activating a first transducer of the two or more transducers at a first time and (ii) activating a second transducer of the two or more transducers at a second time after the first time. For example, in some circumstances (e.g., depending on a target location and a position of each transducer on the wearable device), the two or more transducers are activated at different times to ensure that the waves transmitted by the two or more transducers constructively interfere with another at the target location. In some embodiments, a time difference between each respective activation increases based a distance between each transducer on the wearable device. In some embodiments, the time difference between each respective activation is further determined according to the selected values for the characteristics of the waves (discussed below).

It is noted that, in some embodiments, the method 1000 includes activating a single transducer. For example, instead of the wearable device including a plurality of transducers, the wearable device may include one large transducer that is able to create multiple waves (e.g., the transducer has a shape of a lattice or a layer that can be activated selectively at different locations). Such a circumstance may arise when a magnitude of the haptic stimulation needs to be subtle (i.e., almost unnoticeable). Additionally, in some instances, the single transducer is able to create haptic stimulations at various magnitudes (large and small). In such embodiments, the following steps in the method 1000 may be performed by a single transducer.

The method 1000 further includes selecting (1006) values for characteristics of waves to be generated by the two or more transducers based, at least in part, on a known impedance of the medium. In some instances, the known impedance of the medium is determined based on characteristics of the user. The characteristics of the user include but are not limited to age, sex, body fat index, and area of the body. For example, a wrist of an older male user may have a first known impedance and a calf of a younger female user may have a second known impedance different from the first known impedance. In light of these differences, the selected values for the characteristics of the waves to be generated for the first known impedance may differ from the selected values for the characteristics of the waves to be generated for the second known impedance. The characteristics of the waves include but are not limited to frequency, amplitude, phase, wavelength, and gain. Moreover, in some embodiments, shapes of the waves include but are not limited to sine, triangle, square, asymmetric, and arbitrary. In some embodiments, selecting (1006) the values for the characteristics of the waves to be generated by the two or more transducers is further based on a target location and an arrangement of the transducer array 110 (e.g., account for differences between transducer array 110 (FIG. 4) and transducer array 110 (FIG. 6B)).

In some embodiments, time reversal focusing techniques are used to determine the values for the characteristics of the waves and a time shift (as explained above with reference to FIG. 4).

The method 1000 further includes generating (1008), by the two or more transducers, waves that constructively interfere at a target location to create a haptic stimulation on a user of the wearable device. The waves have the selected values. In some embodiments, the haptic stimulation is selected from a group comprising a touch stimulation, a swipe stimulation, a pull stimulation, a push stimulation, a rotation stimulation, a heat stimulation, and a pain stimulation. For example, a first haptic stimulation may mimic a breath on the back of the user's hand (a subtle haptic stimulation) and a second haptic stimulation may mimic a flame on the palm of the user's hand (an intense haptic stimulation) (e.g., the wearer's character in a virtual-reality video game is lighting a cigar). In some embodiments, the first haptic stimulation may mimic physiological states of the user. For example, if the wearer's character in a virtual-reality video game is running, then a haptic stimulation mimicking the wearer's heartbeat may be created using data from the sensors 114 of the wearable device 102 (e.g., the optional IMU and/or the sensors 114, such as a heart rate sensor). In some embodiments, the wearable device is positioned on the wearer's chest.

It is noted that the target location can be located on the wearer's other arm/hand. For example, the wearable device 102 may be worn on the wearer's left hand, and the target location may be on the wearer's right forearm. Accordingly, when the wearer's two arms come into contact (i.e., if the wearer touches his or her left forearm with his or her right index finger), the haptic stimulation may be created in the right index finger, which is then felt in the left forearm when contact is made between the two body parts. Because of the different distribution of receptors in the arms and hands, it may be less complex to induce the percept of a localized stimulation on a finger, rather than the forearm.

In some embodiments, the method 1000 further includes receiving an instruction from a host (e.g., host system 130, FIG. 1) in communication with the wearable device. In some embodiments, the instruction from the host is based on information received from one or more sensors of the wearable device 102 (e.g., based on information from the optional IMU and/or information from the sensors 114, such as a heart rate sensor). Alternatively or in addition, the instruction from the host is based on information received from one or more sensors of the head-mounted display. Alternatively or in addition, the instruction from the host is based on media content of an application (e.g., VR/AR applications 336, FIG. 3) executing at the host (e.g., visual and/or audio data of a game or other program). Further, in some embodiments, activating the two or more transducers is performed in response to receiving the instruction from the host. In some embodiments, the instruction received from the host identifies the target location. In some embodiments, the target location is separated from the wearable device by a distance. For example, the wearable device is attached to a wrist of the user, and the target location is on the hand of the user.

To further illustrate using the cigar example from above. The host may communicate visual data with a head-mounted display 140 (FIG. 1), where the visual data, when displayed by the head-mounted display, depicts the wearer's character in a virtual-reality video game lighting a cigar. Concurrently, the host may communicate an instruction to the wearable device, where the instruction, when performed by the wearable device, causes the wearable device to generate waves by the two or more transducers that create a haptic stimulation that mimics the flame displayed by the head-mounted display 140. As one can imagine, in order for the haptic stimulation to be realistic, the haptic stimulation coincides with the visual data displayed by the head-mounted display 140. Moreover, because the wearable device is attached to the user's wrist, the user's hand remains unencumbered, which results in a more realistic virtual reality (or augmented reality) experience for the user.

Further, in those embodiments where the instruction is received from the host, the wearable device includes a communication radio (e.g., communications component 112, FIG. 1) in wireless communication with the host. The communication radio receives the instructions from the host (e.g., via a communication signal 116, FIG. 1).

In some embodiments, generating the waves by the two or more transducers comprises transmitting the waves into a wrist of the user in a first direction (or various other parts of the body depending on a location of the wearable device, e.g., ankle, bicep, etc.). In such embodiments, the waves propagate through the user's body (e.g., skin, flesh, bone, blood vessels, etc.) away from the wrist in a second direction and constructively interfere at the target location. The first direction is substantially perpendicular to the second direction. It is noted that each wave propagating through the user's body may propagate in a unique direction that is different from the first direction, and the direction of other propagating waves.

In some embodiments, the two or more transducers are separated from one another by at least one other transducer. Alternatively, in some embodiments, the two or more transducers are adjacent to one another on the wearable device. In some embodiments, the plurality of transducers is spaced equidistance from one another on the wearable device. In some embodiments, the two or more transducers include all the transducers in the plurality of transducers.

In some embodiments, the plurality of transducers is a first plurality of transducers and the wearable device further comprises a second plurality of transducers. In some embodiments, the first plurality of transducers generates waves at a first frequency, and the second plurality of transducers generates waves at a second frequency distinct from the first frequency. In some embodiments, the first plurality of transducers and the second plurality of transducers generate waves at a substantially similar frequency. In some embodiments, the first and second pluralities of transducers are arranged in an array. Various arrangements of transducers are discussed in further detail at FIGS. 7A-7B.

In some embodiments, the waves are generated at a frequency range between 30 and 300 Hz. It should be noted that greater (or lesser) frequencies can also be used, depending on the circumstances. In some embodiments, the waves are generated at a frequency range between 20 and 20,000 Hz.

In some embodiments, the method 1000 further includes, at a second wearable device (e.g., wearable device 102b, FIG. 1) having a second plurality of transducers that can each generate one or more waves that propagate away from the second wearable device through the medium, activating two or more transducers of the second plurality of transducers. The second wearable device selects second values for characteristics of waves generated by the two or more transducers of the second plurality of transducers based, at least in part, on the known impedance of the medium. Further, the second wearable device generates, by the two or more transducers of the second plurality of transducers, waves that constructively interfere at a different target location to create a second haptic stimulation on the user. The waves have the second selected values.

For example, the first wearable device may be attached to a left wrist of the user and the second wearable device may be attached to a right wrist of the user. In another example (or in addition to the previous example), the first wearable device may be attached to a left ankle of the user and the second wearable device may be attached to a right ankle of the user. As discussed above, the wearable devices may be attached to various body parts.

In some embodiments, the medium associated with the first wearable device is a first medium and the medium associated with the second wearable device is a second medium having a different known impedance from the known impedance of the first medium. Accordingly, the second selected values may differ from the first selected values based on the impedance difference between the first and second media. In some embodiments, the known impedances 232 are stored in memory 106 of the wearable device(s) (FIG. 2). Alternatively or in addition, the known impedances are stored in memory 134 of the host system (FIG. 3) (not shown).

In some embodiments, the method 1000 includes activating one or more transducers on the first wearable device and one or more transducers on the second wearable device, instead of just activating transducers on the first wearable device (or in addition to activating the two or more transducers on the first wearable device).

Figure 11:
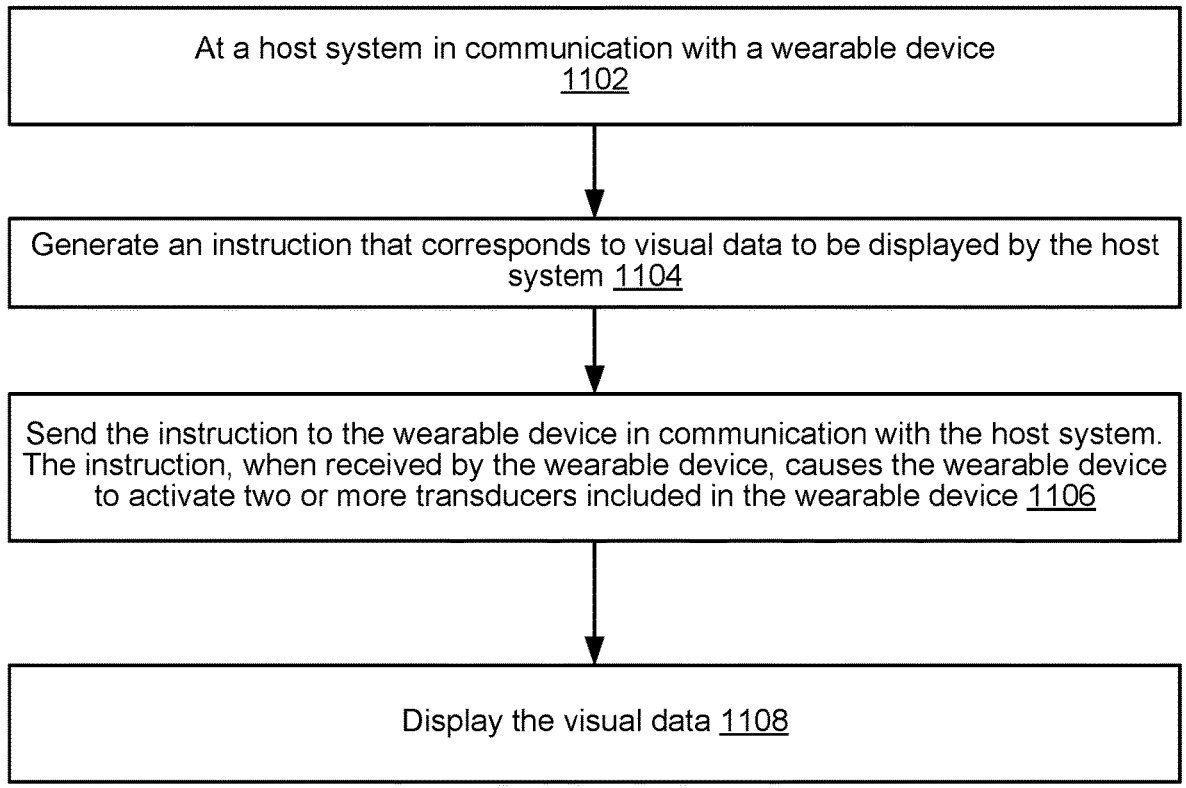
FIG. 11 is a flow diagram illustrating a method of managing creation of localized haptic stimulations in accordance with some embodiments.

FIG. 11 is a flow diagram illustrating a method 1100 of managing creation of localized haptic stimulations in accordance with some embodiments. The steps of the method 1100 may be performed by a host system (e.g., computer system 130, FIG. 1). FIG. 11 corresponds to instructions stored in a computer memory or computer readable storage medium (e.g., memory 134 of the computer system 130). For example, the operations of method 1000 are performed, at least in part, by a communication module (e.g., communication module 318, FIG. 3), a virtual-reality/augment reality generation module (e.g., virtual-reality generation module 320, FIG. 3), an instruction generation module (e.g., instruction generation module 322, FIG. 3), and/or a display module (e.g., display module 324, FIG. 3). In some embodiments, the host system corresponds to the AR system 1400 and/or the VR system 1500.

It is noted that the steps of the method 1100 can be performed in conjunction with the steps the method 1000. The host system is in communication with at least one wearable device (e.g., wearable device 102a, FIG. 1). However, in some embodiments, the host system is in communication with multiple wearable devices, and the host system uses mapping data 334 to manage each wearable device (FIG. 3). It is noted that the various wearable devices are not limited to particular appendage, and therefore, the host system updates the mapping data 334 upon start-up of the system. To accomplish the updating, the wearable device(s) being used each send location information to the host system, and the host system updates the mapping data 334 based on the location information. In this way, the host system can determine that a first wearable device is attached to the left arm, even though the first wearable device was attached to the right arm during a previous usage of the system. In some embodiments, each wearable device has an identifier that allows the host system to differentiate between each wearable device (as described above with reference to FIG. 2). The identifier may be included in the location information or may be sent separately.

The method 1100 includes generating (1104) an instruction that corresponds to visual data to be displayed by the host system. In some embodiments, the host system generates the instruction based on information received from the sensors 114 on the wearable device 102. Additionally, the information received by the host system can also include information from the head-mounted display 140. For example, cameras on the head-mounted display 140 may capture movements of the wearable device 102, and the host system can use this additional information when generating the instruction.

The method 1100 further includes sending (1106) the instruction to the wearable device in communication with the host system (e.g., send the instruction in a communication signal 118 from the communications component 136, FIG. 1). The instruction, when received by the wearable device, causes the wearable device to activate two or more transducers included in the wearable device.

After (or while) sending the instruction, the method further includes displaying the visual data. For example, the head-mounted display 140 may receive the visual data from the host system, and may in turn display the visual data on the display 144. As an example, if the host system receives information from the sensors 114 of the wearable device 102 that the user has closed his fingers around a position corresponding to a coffee mug in the virtual environment and raised his hand, a simulated hand in a virtual-reality application picks up the virtual coffee mug and lifts it to a corresponding height.

In conjunction with displaying the visual data, the wearable device generates, by the two or more transducers, waves that constructively interfere at a target location to create a haptic stimulation on a user of the wearable device (the user being the same user who is also wearing the head-mounted display). Moreover, the haptic stimulation created on the user corresponds to the visual data displayed by the host system. For example, using the coffee cup example from above, the haptic stimulation may prevent (or attempt to prevent) one or more of the user's finger from curling past a certain point to simulate the sensation of touching a solid coffee mug.

To further illustrate the above, an exemplary embodiment is provided below.

In the particular example, the host 130 is a virtual (and/or augment) reality gaming device attached to a head-mounted display 140 (e.g., as shown in FIG. 1; AR system 1400, FIG. 14; VR 1500, FIG. 15). The host 130 instructs the head-mounted display to display gaming data while the user is playing the virtual-reality video game (e.g., video information to be displayed by the head-mounted display). The gaming data, when displayed by the head-mounted display, depicts an insect crawling across the wearer's hand in the virtual-reality video game. Concurrently, the host may communicate an instruction to the wearable device, where the instruction, when performed by the wearable device, causes the wearable device to generate waves by the two or more transducers that create a haptic stimulation that mimics the insect displayed by the head-mounted display 140 (i.e., the haptic stimulation coincides with the gaming data displayed by the head-mounted display 140). In this way, the user not only experiences the insect visually, but also feels the insect crawling on his or her hand in virtual and/or augment reality.

It is noted that multiple haptic stimulations can be created to follow along with the video information displayed by the head-mounted display 140. For example, a first haptic stimulation may be created at a first time, a second haptic stimulation may be created at a second time, and so on. Moreover, if multiple wearable devices are in communication with the host, then multiple haptic stimulations can be created at different locations on the user's body. For example, a first haptic stimulation may be created at a first limb by a first wearable device, a second haptic stimulation may be created at a second limb by a second wearable device, and so on.

Embodiments of the instant disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the same. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1300 in FIG. 13. Other artificial reality systems may include an NED that also provides visibility into the real world (e.g., AR system 1400 in FIG. 14) or that visually immerses a user in an artificial reality (e.g., VR system 1500 in FIG. 15). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user (e.g., wearable device 102*a*, wearable device 102*b*, . . . wearable device 102*n*), devices worn by one or more other users, and/or any other suitable external system.

Figure 13:
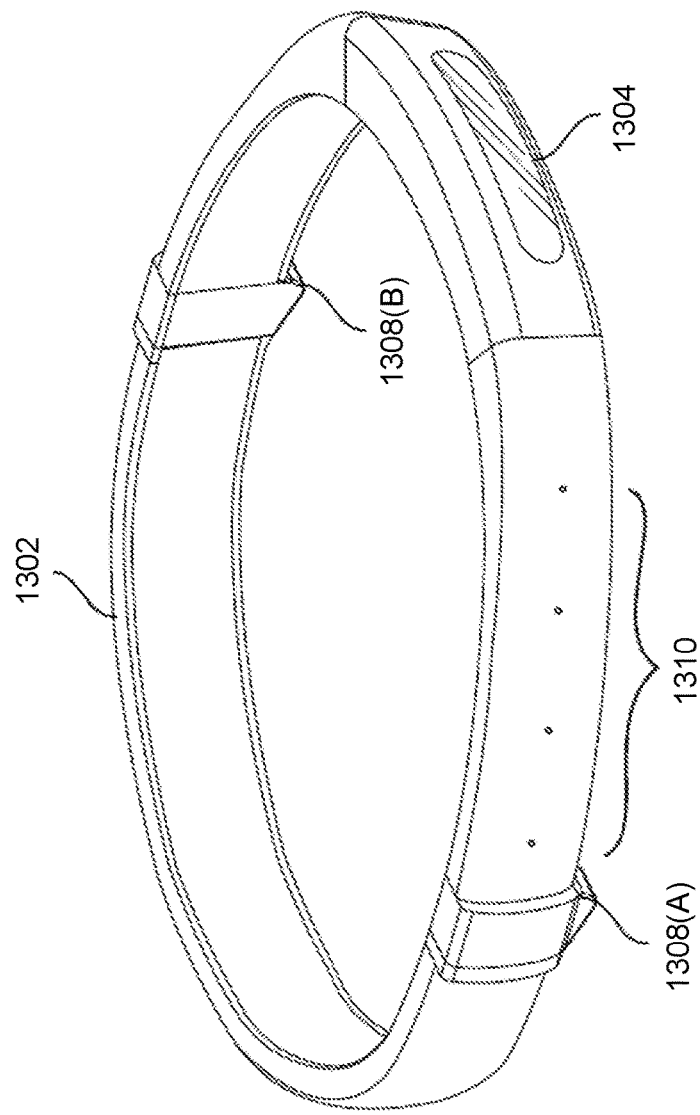
FIG. 13 illustrates an embodiment of an artificial reality device.

FIGS. 13-15 provide additional examples of the devices used in the system 100. AR system 1300 in FIG. 13 generally represents a wearable device dimensioned to fit about a body part (e.g., a head) of a user. The AR system 1300 may include the functionality of the wearable device 102, and may include additional functions. As shown, the AR system 1300 includes a frame 1302 (e.g., band) and a camera assembly 1304 that is coupled to frame 1302 and configured to gather information about a local environment by observing the local environment. The AR system 1300 may also include one or more transducers (e.g., instances of the transducers 410, FIG. 4). In one example, the AR system 1300 includes output transducers 1308(A) and 1308(B) and input transducers 1310. Output transducers 1308(A) and 1308(B) may provide audio feedback, haptic feedback, and/or content to a user, and input audio transducers may capture audio (or other signals/waves) in a user's environment. As such, the transducers of the AR system 1300 may be configured to generate waves for creating haptic stimulations, as discussed in detail above.

Thus, the AR system 1300 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 1300 may not include an NED, the AR system 1300 may include other types of screens or visual feedback devices (e.g., a display screen integrated into a side of frame 1302).

The embodiments discussed in this disclosure may also be implemented in AR systems that include one or more NEDs. For example, as shown in FIG. 14, the AR system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While the AR system 1400 includes two displays, embodiments of this disclosure may be implemented in AR systems with a single NED or more than two NEDs.

In some embodiments, the AR system 1400 may include one or more sensors, such as sensor 1440. Sensor 1440 may generate measurement signals in response to motion of AR system 1400 and may be located on substantially any portion of frame 1410. Sensor 1440 may include a position sensor, an inertial measurement unit (IMU), a depth camera assembly, or any combination thereof. In some embodiments, the AR system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof. Sensors are also discussed above with reference to FIG. 1 (e.g., sensors 145 of the head-mounted display 140).

The AR system 1400 may also include a microphone array with a plurality of acoustic sensors 1420(A)-1420(J), referred to collectively as acoustic sensors 1420. Acoustic sensors 1420 may be transducers that detect air pressure variations induced by sound waves. Each acoustic sensor 1420 may be configured to detect sound and convert the detected sound into an electronic format (e.g., an analog or digital format). The microphone array in FIG. 14 may include, for example, ten acoustic sensors: 1420(A) and 1420(B), which may be designed to be placed inside a corresponding ear of the user, acoustic sensors 1420(C), 1420(D), 1420(E), 1420(F), 1420(G), and 1420(H), which may be positioned at various locations on frame 1410, and/or acoustic sensors 1420(I) and 1420(J), which may be positioned on a corresponding neckband 1405. In some embodiments, the neckband 1405 is an example of the computer system 130.

The configuration of acoustic sensors 1420 of the microphone array may vary. While the AR system 1400 is shown in FIG. 14 as having ten acoustic sensors 1420, the number of acoustic sensors 1420 may be greater or less than ten. In some embodiments, using higher numbers of acoustic sensors 1420 may increase the amount of audio information collected and/or the sensitivity and accuracy of the audio information. In contrast, using a lower number of acoustic sensors 1420 may decrease the computing power required by a controller 1450 to process the collected audio information. In addition, the position of each acoustic sensor 1420 of the microphone array may vary. For example, the position of an acoustic sensor 1420 may include a defined position on the user, a defined coordinate on the frame 1410, an orientation associated with each acoustic sensor, or some combination thereof.

Acoustic sensors 1420(A) and 1420(B) may be positioned on different parts of the user's ear, such as behind the pinna or within the auricle or fossa. Or, there may be additional acoustic sensors on or surrounding the ear in addition to acoustic sensors 1420 inside the ear canal. Having an acoustic sensor positioned next to an ear canal of a user may enable the microphone array to collect information on how sounds arrive at the ear canal. By positioning at least two of acoustic sensors 1420 on either side of a user's head (e.g., as binaural microphones), the AR device 1400 may simulate binaural hearing and capture a 3D stereo sound field around about a user's head. In some embodiments, the acoustic sensors 1420(A) and 1420(B) may be connected to the AR system 1400 via a wired connection, and in other embodiments, the acoustic sensors 1420(A) and 1420(B) may be connected to the AR system 1400 via a wireless connection (e.g., a Bluetooth connection). In still other embodiments, acoustic sensors 1420(A) and 1420(B) may not be used at all in conjunction with the AR system 1400.

Acoustic sensors 1420 on frame 1410 may be positioned along the length of the temples, across the bridge, above or below display devices 1415(A) and 1415(B), or some combination thereof. Acoustic sensors 1420 may be oriented such that the microphone array is able to detect sounds in a wide range of directions surrounding the user wearing AR system 1400. In some embodiments, an optimization process may be performed during manufacturing of AR system 1400 to determine relative positioning of each acoustic sensor 1420 in the microphone array.

The AR system 1400 may further include or be connected to an external device (e.g., a paired device), such as neckband 1405. As shown, neckband 1405 may be coupled to eyewear device 1402 via one or more connectors 1430. Connectors 1430 may be wired or wireless connectors and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof. Furthermore, neckband 1405 generally represents any type or form of paired device. Thus, the following discussion of neckband 1405 may also apply to various other paired devices, such as smart watches, smart phones, wrist bands, other wearable devices, hand-held controllers, tablet computers, laptop computers, etc.

Pairing external devices, such as neckband 1405, with AR eyewear devices may enable the eyewear devices to achieve the form factor of a pair of glasses while still providing sufficient battery and computation power for expanded capabilities. Some or all of the battery power, computational resources, and/or additional features of the AR system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 1405 may be communicatively coupled with eyewear device 1402 and/or to other devices. The other devices may provide certain functions (e.g., tracking, localizing, depth mapping, processing, storage, etc.) to the AR system 1400. In the embodiment of FIG. 14, neckband 1405 may include two acoustic sensors (e.g., 1420(I) and 1420(J)) that are part of the microphone array (or potentially form their own microphone subarray). Neckband 1405 may also include a controller 1425 and a power source 1435.

Acoustic sensors 1420(I) and 1420(J) of neckband 1405 may be configured to detect sound and convert the detected sound into an electronic format (analog or digital). In the embodiment of FIG. 14, acoustic sensors 1420(I) and 1420(J) may be positioned on neckband 1405, thereby increasing the distance between neckband acoustic sensors 1420(I) and 1420(J) and other acoustic sensors 1420 positioned on eyewear device 1402. In some cases, increasing the distance between acoustic sensors 1420 of the microphone array may improve the accuracy of beamforming performed via the microphone array. For example, if a sound is detected by acoustic sensors 1420(C) and 1420(D) and the distance between acoustic sensors 1420(C) and 1420(D) is greater than, e.g., the distance between acoustic sensors 1420(D) and 1420(E), the determined source location of the detected sound may be more accurate than if the sound had been detected by acoustic sensors 1420(D) and 1420(E).

Controller 1425 of neckband 1405 may process information generated by the sensors on neckband 1405 and/or AR system 1400. For example, controller 1425 may process information from the microphone array that describes sounds detected by the microphone array. For each detected sound, controller 1425 may perform a direction of arrival (DOA) estimation to estimate a direction from which the detected sound arrived at the microphone array. As the microphone array detects sounds, controller 1425 may populate an audio data set with the information. In embodiments in which AR system 1400 includes an IMU, controller 1425 may compute all inertial and spatial calculations from the IMU located on eyewear device 1402. Connector 1430 may convey information between AR system 1400 and neckband 1405 and between AR system 1400 and controller 1425. The information may be in the form of optical data, electrical data, wireless data, or any other transmittable data form. Moving the processing of information generated by AR system 1400 to neckband 1405 may reduce weight and heat in eyewear device 1402, making it more comfortable to a user.

Power source 1435 in neckband 1405 may provide power to eyewear device 1402 and/or to neckband 1405. Power source 1435 may include, without limitation, lithium-ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial reality systems may, instead of blending an artificial reality with actual reality, substantially replace one or more of a user's sensory perceptions of the real world with a virtual experience. One example of this type of system is a head-worn display system, such as VR system 1500 in FIG. 15, that mostly or completely covers a user's field of view. VR system 1500 may include a front rigid body 1502 and a band 1504 shaped to fit around a user's head. VR system 1500 may also include output audio transducers 1506(A) and 1506(B). Furthermore, while not shown in FIG. 15, front rigid body 1502 may include one or more electronic elements, including one or more electronic displays, one or more IMUs, one or more tracking emitters or detectors, and/or any other suitable device or system for creating an artificial reality experience. Although not shown, the VR system 1500 may include the computer system 130.

Artificial reality systems may include a variety of types of visual feedback mechanisms. For example, display devices in AR system 1400 and/or VR system 1500 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1400 and/or VR system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1300, AR system 1400, and/or VR system 1500 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 13 and 15, output audio transducers 1308(A), 1308(B), 1306(A), and 1506(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1310 may include condenser microphones, dynamic microphones, ribbon microphones, and/or any other type or form of input transducer. In some embodiments, a single transducer may be used for both audio input and audio output.

The artificial reality systems shown in FIGS. 13-15 may include tactile (i.e., haptic) feedback systems, which may be incorporated into headwear, gloves, body suits, handheld controllers, environmental devices (e.g., chairs, floormats, etc.), and/or any other type of device or system, such as the wearable devices 102 discussed herein. Additionally, in some embodiments, the haptic feedback systems may be incorporated with the artificial reality systems (e.g., the AR system 1300 may include the wearable device 102 (FIG. 1). Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 1300, 1400, and 1500) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is noted that the embodiments disclosed herein can also be combined with any of the embodiments described in U.S. Provisional Application No. 62/636,699, filed Feb. 28, 2018, entitled "Methods, Devices, and Systems for Creating Haptic Stimulations and Tracking Motion of a User;" U.S. Provisional Application No. 62/647,559, filed Mar. 23, 2018, entitled "Methods, Devices, and Systems for Determining Contact On a User of a Virtual Reality and/or Augmented Reality Device;" and U.S. Provisional Application No. 62/647,560, filed Mar. 23, 2018, entitled "Methods, Devices, and Systems for Projecting an Image Onto a User and Detecting Touch Gestures."

It is also noted that the embodiments disclosed herein can also be combined with any of the embodiments described in U.S. Utility patent application Ser. No. 16/241,890 entitled "Methods, Devices, and Systems for Determining Contact On a User of a Virtual Reality and/or Augmented Reality Device," filed Jan. 7, 2019, U.S. Utility patent application Ser. No. 16/241,893, entitled "Methods, Devices, and Systems for Displaying a User Interface on a User and Detecting Touch Gestures," filed Jan. 7, 2019, and U.S. Utility patent application Ser. No. 16/241,871, entitled "Methods, Devices, and Systems for Creating Haptic Stimulations and Tracking Motion of a User," filed Jan. 7, 2019, each of which is incorporated by reference herein in its entirety.

What is claimed is:

1. A method, comprising:
   at a wearable device comprising a plurality of transducers that can each generate one or more waves that propagate away from the wearable device through a medium:
     selecting two or more transducers of the plurality of transducers;
     selecting values for characteristics of waves to be generated by the two or more transducers based, at least in part, on a known impedance of the medium; and
     activating the two or more transducers, producing waves having the selected values, including transmitting the waves into a wrist of a user in a first direction, wherein the waves propagate through the user's body away from the wrist in a second direction and constructively interfere at a target location to create a haptic stimulation on the user, and the first direction is substantially perpendicular to the second direction.

2. The method of claim 1, wherein activating the two or more transducers comprises:
   activating a first transducer of the two or more transducers at a first time; and
   activating a second transducer of the two or more transducers at a second time after the first time.

3. The method of claim 1, wherein activating the two or more transducers comprises activating the two or more transducers simultaneously.

4. The method of claim 1, further comprising, at the wearable device:
   receiving an instruction from a host in communication with the wearable device,
   wherein activating the two or more transducers is performed in response to receiving the instruction from the host.

5. The method of claim 4, wherein the instruction received from the host identifies the target location.

6. The method of claim 4, wherein:
   the wearable device further comprises a communication radio in wireless communication with the host; and
   the communication radio receives the instruction from the host.

7. The method of claim 1, wherein:
   the wearable device further comprises a controller in communication with the plurality of transducers; and
   the controller performs the activating and the selecting.

8. The method of claim 1, wherein:
   the wearable device is a first wearable device;
   the selected values are first selected values;
   the plurality of transducers is a first plurality of transducers;
   the haptic stimulation created by the waves generated by the two or more transducers is a first haptic stimulation; and
   the method further comprises, at a second wearable device comprising a second plurality of transducers that can each generate one or more waves that propagate away from the second wearable device through the medium:
     activating two or more transducers of the second plurality of transducers;
     selecting second values for characteristics of waves generated by the two or more transducers of the second plurality of transducers based, at least in part, on the known impedance of the medium; and
     generating, by the two or more transducers of the second plurality of transducers, waves that constructively interfere at a different target location to create a second haptic stimulation on the user, the waves having the second selected values.

9. The method of claim 8, wherein:
   the medium associated with the first wearable device is a first medium; and
   the medium associated with the second wearable device is a second medium having a different known impedance from the known impedance of the first medium.

10. The method of claim 9, wherein the second selected values differ from the first selected values based on impedance differences between the first and second media.

11. The method of claim 1, wherein the target location is separated from the wearable device by a distance.

12. The method of claim 1, wherein:
the wearable device further comprises a band to be secured around a wrist of the user; and
each of the plurality of transducers is coupled to the band.

13. The method of claim 12, wherein transducers of the plurality of transducers are radially spaced along a perimeter of the band.

14. The method of claim 13, wherein the two or more transducers are separated from one another by at least one other transducer.

15. The method of claim 13, wherein the two or more transducers are adjacent to one another on the wearable device.

16. The method of claim 13, wherein transducers of the plurality of transducers are spaced equidistant from one another on the wearable device.

17. The method of claim 1, wherein:
the plurality of transducers is a first plurality of transducers, and
the wearable device further comprises a second plurality of transducers.

18. A wearable device, comprising:
a plurality of transducers, each transducer being configured to generate one or more waves that propagate away from the wearable device through a medium;
one or more processors; and
memory storing one or more programs, which when executed by the one or more processors cause the wearable device to:
select two or more transducers of the plurality of transducers;
select values for characteristics of waves to be generated by the two or more transducers based, at least in part, on a known impedance of the medium; and
activate the two or more transducers, producing waves having the selected values, including transmitting the waves into a wrist of a user in a first direction, wherein the waves propagate through the user's body away from the wrist in a second direction and constructively interfere at a target location to create a haptic stimulation on the user, and the first direction is substantially perpendicular to the second direction.

19. A non-transitory computer-readable storage medium storing one or more programs configured for execution by one or more processors of a wearable device having a plurality of transducers, each transducer being configured to generate one or more waves that propagate away from the wearable device through a medium, the one or more programs including instructions, which when executed by the one or more processors cause the wearable device to:
select two or more transducers of the plurality of transducers;
select values for characteristics of waves to be generated by the two or more transducers based, at least in part, on a known impedance of the medium; and
activate the two or more transducers, producing waves having the selected values, including transmitting the waves into a wrist of a user in a first direction, wherein the waves propagate through the user's body away from the wrist in a second direction and that constructively interfere at a target location to create a haptic stimulation on the user, and the first direction is substantially perpendicular to the second direction.

* * * * *

UNITED STATES PATENT AND TRADEMARK OFFICE
CERTIFICATE OF CORRECTION

PATENT NO. : 10,684,690 B2
APPLICATION NO. : 16/241900
DATED : June 16, 2020
INVENTOR(S) : Keller et al.

It is certified that error appears in the above-identified patent and that said Letters Patent is hereby corrected as shown below:

In the Claims

Claim 19, Column 36, Lines 27-28, please delete "and that constructively" and insert --and constructively--.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*